(12) United States Patent
Brugler et al.

(10) Patent No.: US 8,959,003 B2
(45) Date of Patent: Feb. 17, 2015

(54) INTERACTIVE DATA VISUALIZATION FOR TREND ANALYSIS

(75) Inventors: Thomas S. Brugler, Fuquay-Varina, NC (US); Randall A. Craig, Raleigh, NC (US); Vincent C. Conzola, Raleigh, NC (US); Todd M. Eischeid, Cary, NC (US); Mark E. Molander, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 630 days.

(21) Appl. No.: 13/177,721

(22) Filed: Jul. 7, 2011

(65) Prior Publication Data

US 2013/0013248 A1 Jan. 10, 2013

(51) Int. Cl.
*G01K 1/00* (2006.01)
*G01K 3/00* (2006.01)
*G06T 11/20* (2006.01)
*G06F 11/30* (2006.01)
*G06F 11/34* (2006.01)

(52) U.S. Cl.
CPC ........ *G06F 11/3082* (2013.01); *G06F 11/3452* (2013.01)
USPC ............................ 702/130; 374/137; 345/440

(58) Field of Classification Search
USPC .......... 702/130, 127, 179, 182, 189; 345/440, 345/428, 440.2, 441, 581, 589, 593, 600, 345/618–619; 374/100, 137; 717/100, 717/104–109, 124–125; 714/47.1, 47.3, 57, 714/100; 700/108–110; 703/5, 17, 20, 22
See application file for complete search history.

(56) References Cited

U.S. PATENT DOCUMENTS

| 2006/0028471 A1 | 2/2006 | Kincaid et al. | |
| 2006/0059063 A1* | 3/2006 | LaComb et al. | 705/35 |
| 2010/0082386 A1 | 4/2010 | Cao et al. | |
| 2010/0249976 A1* | 9/2010 | Aharoni et al. | 700/110 |

OTHER PUBLICATIONS

Chuah et al., Diagnosing the Root-Causes of Failures from Cluster Log Files, 2010 IEEE, 10 pp.*
Kursun et al., Variation-aware Thermal Characterization and Management of Multi-core Architectures, 2008 IEEE, pp. 280-285.*
Mashima et al., Visualizing Dynamic Data with Maps, Mar. 1-4, 2011, IEEE Pacific Visualization Symposium, Hong Kong, pp. 155-162.*

* cited by examiner

*Primary Examiner* — Toan Le
(74) *Attorney, Agent, or Firm* — Schmeiser, Olsen & Watts; Matthew Chung

(57) ABSTRACT

A method and system for identifying a trend in data of heat maps. An initial set of comparison heat maps included in the repository is determined and displayed based on how closely initial comparison area(s) of each comparison heat map match initial target area(s) of a first heat map. A review of the initial set of comparison heat maps determines additional comparison area(s) corresponding to additional target area(s) of the first heat map. In an iterative process, an additional set of comparison heat maps is determined and displayed based on how closely initial and additional comparison areas match respective initial and additional target areas of the first heat map. A trend relating initial and additional target areas is identified based on the displayed additional set of comparison heat maps and based on how closely comparison areas match their respective target areas.

18 Claims, 13 Drawing Sheets

INTERACTIVE DATA VISUALIZATION FOR TREND ANALYSIS

TECHNICAL FIELD

The present invention relates to a data processing method and system for identifying trends in data visualizations, and more particularly to a data processing and search technique for identifying trends in heat map data by interactively managing searches of heat maps.

BACKGROUND

Known methods for identifying a root cause of an anomaly shown in a heat map or a tree map includes collecting other, similar heat maps or tree maps and looking for and identifying trends shown by the collected maps. By "eyeballing" the other, similar maps, a person discovers and analyzes related anomalies. By analyzing the related anomalies, the person identifies the root cause of the anomaly. "Eyeballing" the other, similar maps is a very manual process that is extremely difficult, time-consuming and error-prone when a large number of heat maps or tree maps is available. Thus, there exists a need to overcome at least one of the preceding deficiencies and limitations of the related art.

BRIEF SUMMARY

Embodiments of the present invention provide a method of identifying a trend in heat map data. The method comprises:

a computer receiving initial target area(s) of a first heat map;

the computer determining initial values indicating measures of matching between initial comparison area(s) of each comparison heat map of a plurality of comparison heat maps stored in a repository and the initial target area(s);

based on the initial values, the computer determining an initial set of comparison heat maps included in the plurality of comparison heat maps;

the computer determining an initial ranking of the initial set of comparison heat maps based on the initial values;

based on the initial ranking, the computer initiating an initial display of the initial set of comparison heat maps and indications of the initial values;

the computer receiving additional target area(s) of the first heat map, wherein the additional target area(s) correspond to additional comparison area(s) included in each comparison heat map of the initial set of comparison heat maps;

the computer determining additional values indicating measures of matching between the initial comparison area(s) and the initial target area(s) and between the additional comparison area(s) and the additional target area(s);

based on the additional values, the computer determining an additional set of comparison heat maps included in the plurality of comparison heat maps;

the computer determining an additional ranking of the additional set of comparison heat maps based on the additional values;

based on the additional ranking, the computer initiating an additional display of the additional set of comparison heat maps and indications of the additional values;

attempting to identify a trend relating the initial and the additional target areas based on the additional display of the additional set of comparison heat maps and the indications of the additional values;

if a result of attempting to identify the trend is the trend is not identified, repeating receiving additional target area(s), determining additional values, determining an additional set of comparison heat maps, determining an additional ranking, initiating an additional display of the additional set of comparison heat maps and the indications of the additional values, and attempting to identify the trend until the result of attempting is the trend is identified; and subsequent to attempting to identify the trend and based on the additional display of the additional set of comparison heat maps and the indications of the additional values, identifying the trend relating the initial target area and the additional target area.

A system, program product and a process for supporting computing infrastructure where the process provides at least one support service are also described herein, where the system, program product and process for supporting computing infrastructure correspond to the aforementioned method.

Embodiments of the present invention provide an easy-to-use interactive data visualization tool that quickly searches on specified region(s) in a heat map, and based on the results of the search, quickly searches again on the specified region(s) and on one or more additionally specified regions in the heat map. The results of the searches may facilitate the identification of a trend in the heat map data.

DETAILED DESCRIPTION

Overview

Embodiments of the present invention may provide a method and system for sifting through a large number of heat maps quickly and efficiently with the goal of finding trends in the heat map data. A user interface provided by embodiments of the present invention may allow a user to drag and drop user-configurable area(s) (e.g., rectangles and/or other shapes) onto a template heat map to specify target area(s). A computer automatically compares the specified target area(s) against a repository of heat maps to quickly find other heat maps having area(s) that are similar to the target area(s). An analysis of the heat maps found to have area(s) similar to the target area(s) facilitates identifying trends in heat map data.

System for Trend Identification in Heat Map Data

Figure 1:
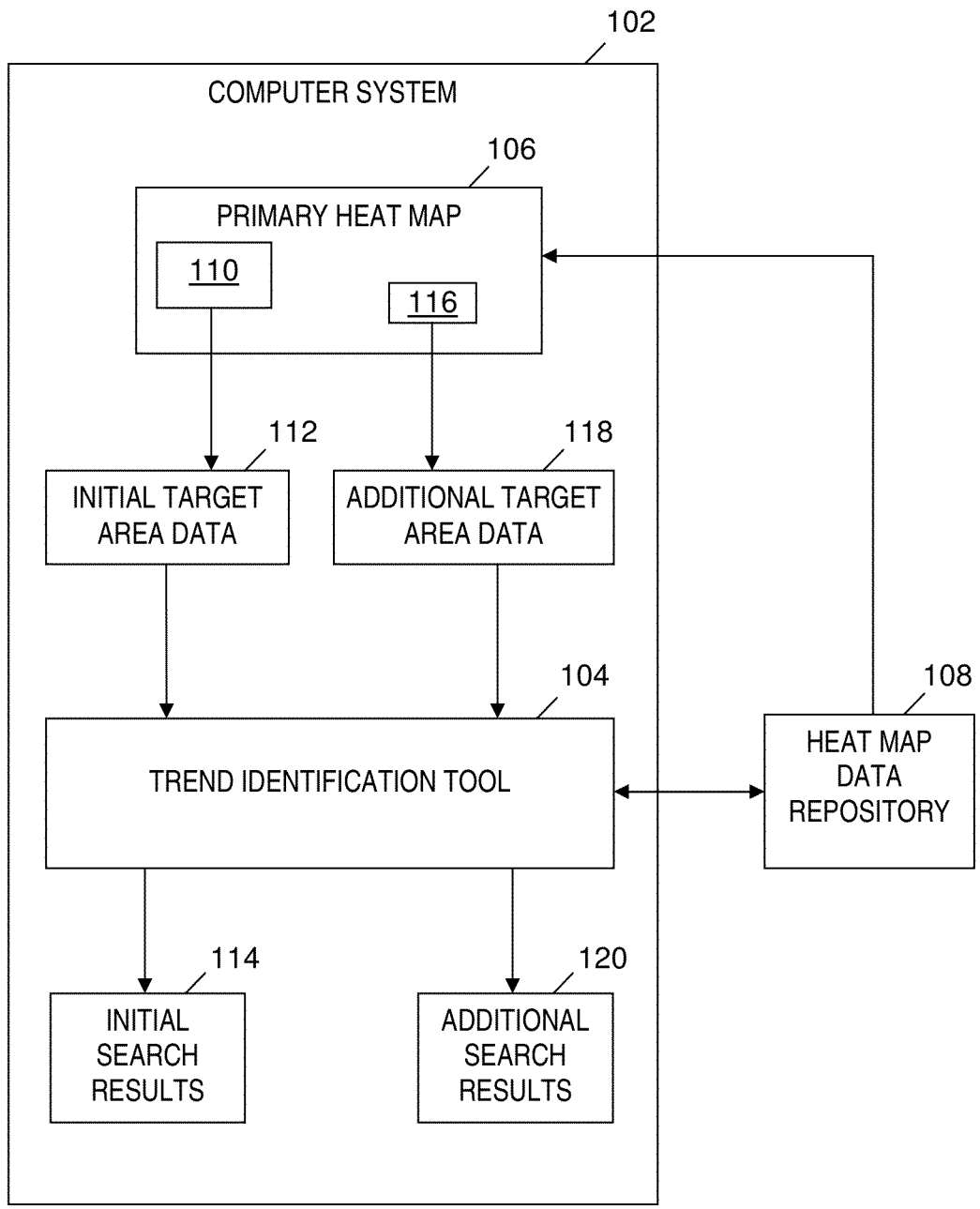
FIG. 1 is a block diagram of a system for identifying a trend in heat map data, in accordance with embodiments of the present invention.

FIG. 1 is a block diagram of a system for identifying a trend in heat map data, in accordance with embodiments of the present invention. System 100 includes a computer system 102 that includes a software-based trend identification tool 104 that identifies trends in heat map data.

Computer system 102 receives a primary heat map 106 as a template heat map. Primary heat map 106 is also referred to herein as a first heat map. In one embodiment, computer system 102 retrieves primary heat map 106 from a repository 108 of heat maps (a.k.a. heat map repository), which is coupled to computer system 102. Repository 108 may store heat maps specified by data recorded in historical time periods. In another embodiment, computer system 102 receives primary heat map 106 as input from another system (not shown). Each target area of initial (a.k.a. first) target area(s) 110 of primary heat map 106 includes one or more colors, which are specified by initial target area data 112. Initial target area(s) 110 are area(s) of primary heat map 106, but each initial target area is less than the entire primary heat map 106.

In one embodiment, primary heat map 106 and heat maps stored in repository 108 are tree maps.

As used herein, a heat map is defined as a data visualization that uses colors to represent data values in a two-dimensional image.

As used herein, a tree map is defined as a type of heat map developed by Ben Shneiderman in 1990, which displays hierarchical (tree-structured) data as a set of nested rectangles. Each branch of the tree is specified by a rectangle that is tiled with smaller rectangles representing sub-branches of the tree. One dimension of the data is shown by the colors of the rectangles. Another dimension of the data is shown by the areas of the rectangles.

Trend identification tool 104 may use initial target area(s) 110 or initial target area data 112 as the basis for performing an initial search for heat maps in repository 108 that each have comparison area(s) similar to initial target area(s) 110. Trend identification tool 104 generates and initiates a display of initial results 114 of the initial search.

A review of initial results 114 determines additional (a.k.a. second) target area(s) 116 of primary heat map 106. Each target area of additional target area(s) 116 includes one or more colors, which are specified by additional target area data 118. Additional target area(s) 116 are area(s) of primary heat map 106 that are different from initial target area(s) 110. Each additional target area of additional target area(s) 116 is less than the entire primary heat map 106.

Trend identification tool 104 may use initial target area(s) 110 and additional target area(s) 116 as the basis for performing an additional search for heat maps in repository 108 that each have initial comparison area(s) and additional comparison area(s), where the initial comparison area(s) are similar to initial target area(s) 110 and the additional comparison area(s) are similar to additional target area(s) 116. The similarity between comparison area(s) and the initial or additional target area(s) may be based on the color compositions of the respective areas matching within a defined tolerance level.

In another embodiment, trend identification tool 104 may use initial target area data 112 and additional target area data 118 as the basis for performing the additional search for heat maps in repository 108, each having the initial and additional comparison areas, as described above. Trend identification tool 104 generates and initiates a display of additional results 120 of the additional search. Results 120 are reviewed to identify a trend in the data of the heat maps, such as a relationship among data specifying initial target area(s) 110 and data specifying additional target area(s) 116, where the relationship indicates a cause of a problem (e.g., a cause of degraded performance of a server computer that is included in a system whose hardware performance is monitored and depicted in primary heat map 106 and heat maps stored in repository 108).

If the review of results 120 does not identify the aforementioned trend in the data of the heat maps, then a determination of an additional target area, an additional search of the repository 108, and a display of similar heat maps in an additional result is iteratively performed until the trend is identified. In each iteration, the displayed similar heat maps have comparison areas that are similar to the target areas determined in the current iteration and the previous iterations. The additional target area(s) and additional search results resulting from aforementioned iterations are not shown in FIG. 1.

Computer system 102 may include hardware and software components, which are described below relative to FIG. 5.

The functionality of the components of system 100 is further described below relative to FIGS. 2A-2B, FIGS. 3A-E, FIGS. 4A-D and FIG. 5.

Process for Trend Identification in Heat Map Data

Figure 2A:
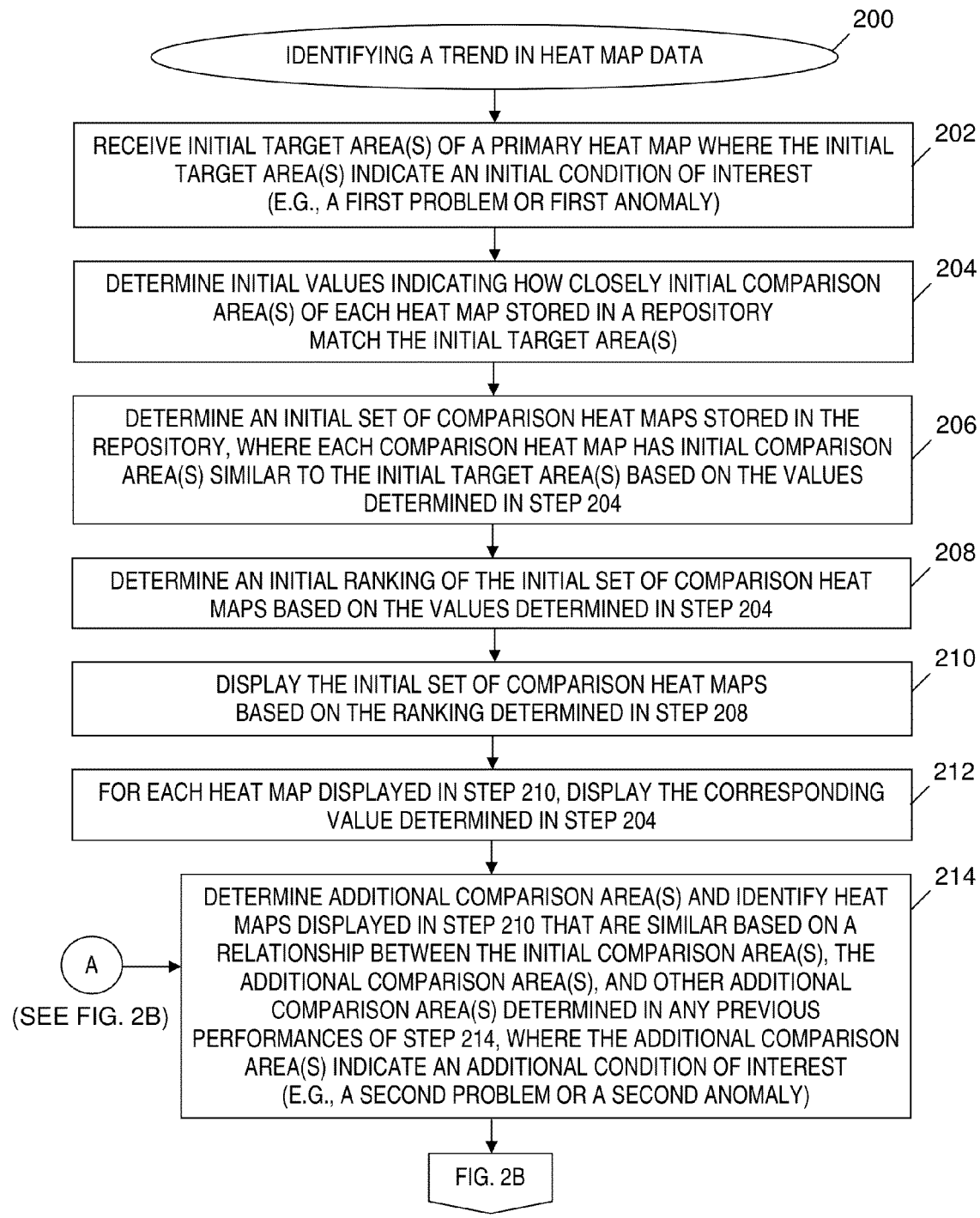
FIGS. 2A-2B depict a flowchart of a process of identifying a trend in heat map data, the process is implemented in the system of FIG. 1, in accordance with embodiments of the present invention.
Figure 2B:
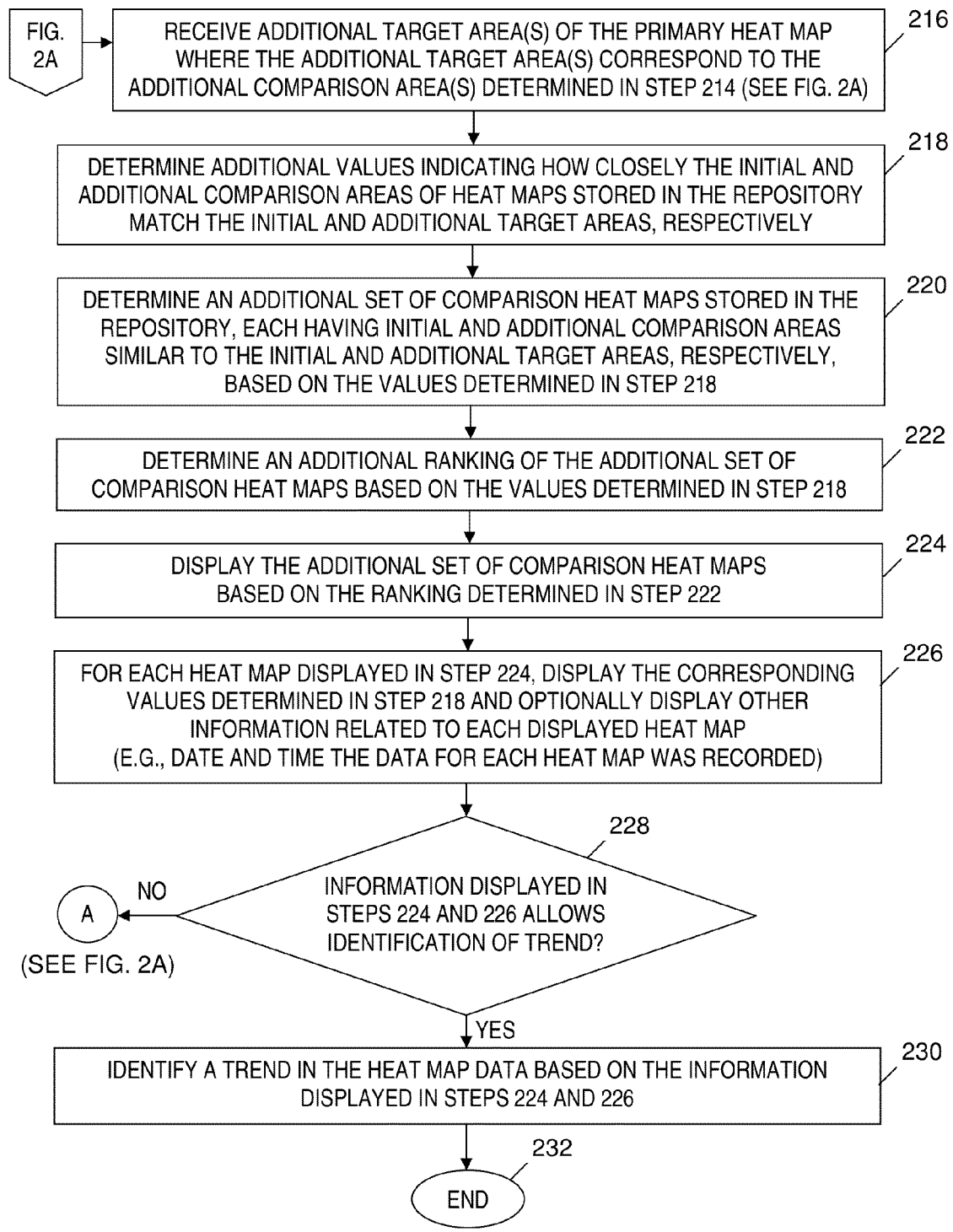

FIGS. 2A-2B depict a flowchart of a process of identifying a trend in heat map data, the process is implemented in the system of FIG. 1, in accordance with embodiments of the present invention. The process for identifying a trend in heat map data starts at step 200 in FIG. 2A. Prior to step 202, historical heat maps are stored in repository 108. In step 202, computer system 102 (see FIG. 1) receives initial target area(s) 110 (see FIG. 1) of primary heat map 106 (see FIG. 1). The initial target area(s) 110 (see FIG. 1) indicate an initial condition of interest to a user of computer system 102 (see FIG. 1). As used herein, a condition of interest is defined as a status of a portion of a system, where the system has portions whose statuses are indicated by a heat map. In one embodiment, the initial target area(s) 110 (see FIG. 1) indicate a first problem or a first anomaly in the performance of hardware included in a system whose status is indicated by primary heat map 106 (see FIG. 1).

In one embodiment, a user of computer system 102 utilizes a user interface (not shown) to drag and drop one or more configurable shapes (e.g., a rectangle) onto primary heat map 106 (see FIG. 1) to specify initial target area(s) 110 (see FIG. 1) based on the borders of the one or more configurable shapes.

In step 204, trend identification tool 104 (see FIG. 1) identifies initial comparison area(s) included in each heat map stored in repository 108 (see FIG. 1), where each initial comparison area is located in a position in its corresponding stored heat map that is the same as the position of a corresponding initial target area of initial target area(s) 110 (see FIG. 1) in primary heat map 106 (see FIG. 1). Also in step 204, trend identification tool 104 (see FIG. 1) determines initial values, where each initial value indicates how closely identified initial comparison area(s) of a corresponding heat map stored in repository 108 (see FIG. 1) match the initial target area(s) 110 (see FIG. 1).

In one embodiment, determining a value that indicates how closely a comparison area of a heat map matches a target area of another heat map includes determining a percentage of portions of the comparison area whose color is identical to the color of corresponding portions of the target area, or a percentage of portions of the comparison area whose color is described by color composition parameters that are within a specified tolerance level of color composition parameters that describe the color of corresponding portions of the target area.

In another embodiment, determining a value that indicates how closely a comparison area of a heat map matches a target area of another heat map includes determining a percentage of portions of the comparison area whose colors are specified based on data that specifies the colors in the comparison area that is identical to (or within a specified tolerance level of) data that specifies colors in corresponding portions of the target area. The data that specifies the colors in the comparison area and the target area is converted to the specified colors in a step that precedes step 202.

The aforementioned percentage of portions may be in a specified range (e.g., 0% to 100%). Instead of percentages, the values determined in step 204 may each be a number in a specified range such as [0,1].

In one embodiment, computer system 102 (see FIG. 1) stores the initial values determined in step 204 in a computer data storage unit coupled to the computer system.

In step 206, trend identification tool 104 (see FIG. 1) performs an initial search of repository 108 (see FIG. 1) that includes determining and retrieving an initial set of comparison heat maps, each having initial comparison area(s) that are similar to initial target area(s) 110 (see FIG. 1) based on a corresponding initial value of the initial values determined in step 204.

As used herein, a comparison area of a heat map being similar to a target area of another heat map is defined as a comparison area having a corresponding value that is greater than or equal to a specified threshold value, where the corresponding value is determined to indicate how closely the comparison area matches the target area; e.g., as described above relative to step 204 or as described below relative to step 218.

The specified threshold value that determines whether initial comparison area(s) of a heat map retrieved from repository 108 (see FIG. 1) are similar to initial target area(s) 110 (see FIG. 1) may be defined and stored in a computer data storage unit prior to step 206.

In step 208 and based on the initial values determined in step 204, trend identification tool 104 (see FIG. 1) determines an initial ranking of the initial set of comparison heat maps retrieved in step 206. For example, each comparison heat map has a corresponding initial value determined in step 204 and trend identification tool 104 (see FIG. 1) ranks the comparison heat maps from the greatest corresponding initial value to the least corresponding initial value.

In step 210, trend identification tool 104 (see FIG. 1) initiates an initial display of the initial set of comparison heat maps determined by the initial search performed in step 206, where the initial display presents the initial set of comparison heat maps in an order based on the initial ranking determined in step 208.

In step 212, trend identification tool 104 (see FIG. 1) initiates a display of indications of the initial values determined in step 204 that correspond to the comparison heat maps in the initial set of comparison heat maps determined in step 206.

The initial search results 114 (see FIG. 1) include the initial set of comparison heat maps in the order indicated by the initial ranking determined in step 208, along with the initial values (or indications thereof) corresponding to each of the comparison heat maps in the initial set of comparison heat maps.

Subsequent to steps 210 and 212, the initial search results 114 (see FIG. 1) are displayed on a display device (not shown) coupled to computer system 102 (see FIG. 1) or coupled to another computer (not shown).

In step 214, a user or computer system 102 (see FIG. 1) reviews the initial search results 114 (see FIG. 1) and tentatively identifies a comparison heat map in the initial set of comparison heat maps that exhibits a similarity, as a whole, to other heat maps in the initial set of comparison heat maps. The exhibited similarity between the tentatively identified comparison heat map and the other comparison heat maps may be based on a measure or estimation of how closely the color composition of the entire tentatively identified comparison heat map matches the color composition of the other comparison heat maps in their respective entireties.

Furthermore, step 214 includes the user or computer system 102 (see FIG. 1) determining additional comparison area(s) that indicate an additional condition of interest, where the aforementioned exhibited similarity between the tentatively identified comparison heat map and the other comparison heat maps includes a relationship between the initial comparison area(s), the additional comparison area(s) determined in the current performance of step 214, and other additional comparison area(s) determined in any previous performances of step 214. In one embodiment, the other areas (i.e., areas other than the initial and additional comparison areas) of each comparison heat map do not consistently exhibit the aforementioned relationship among the initial comparison area(s), the currently determined additional comparison area(s) and any previously determined additional comparison area(s).

In one embodiment, the relationship between the initial and additional comparison areas of a comparison heat map may be that the initial comparison area and the additional comparison area indicate respective problems specified by first data (e.g., first hardware performance data) that specifies the initial comparison area and by second data (e.g., second hardware performance data) that specifies the additional comparison area, while other areas of the comparison heat map do not indicate problems.

In one embodiment, the additional comparison area(s) indicate a second problem or a second anomaly in the performance of corresponding hardware included in a system whose status is indicated by primary heat map 106 (see FIG. 1).

In step 216 in FIG. 2B, computer system 102 (see FIG. 1) receives additional target area(s) 116 (see FIG. 1) included in primary heat map 106 (see FIG. 1), where the additional target area(s) correspond to the additional comparison area(s) determined in step 214 (see FIG. 2A).

In step 218, trend identification tool 104 (see FIG. 1) identifies the additional comparison area(s) included in each heat map stored in repository 108 (see FIG. 1), where each additional comparison area is located in a position in its corresponding stored heat map that is the same as the position of a corresponding additional target area of additional target area(s) 116 (see FIG. 1) in primary heat map 106 (see FIG. 1).

In step 218, trend identification tool 104 (see FIG. 1) may also identify the aforementioned initial comparison area(s) included in each heat map stored in repository 108 (see FIG. 1), as described above in step 204.

Also in step 218, trend identification tool 104 (see FIG. 1) determines additional values, where each additional value indicates how closely identified initial comparison area(s) and identified additional comparison area(s) of a corresponding heat map stored in repository 108 (see FIG. 1) match the initial target area(s) 110 (see FIG. 1) and the additional target area(s) 116 (see FIG. 1), respectively. In one embodiment, each of the additional values is in the form of a pair of values in which one value in the pair indicates how closely initial comparison area(s) of the heat map stored in repository 108 (see FIG. 1) matches the initial target area(s) 110 (see FIG. 1) and the other value in the pair indicates how closely additional comparison area(s) of the heat map matches the additional target area(s) 116 (see FIG. 1).

Determining an additional value in step 218 may be implemented as described in the embodiments presented above relative to step 204. Instead of the percentages mentioned in the embodiments presented above relative to step 204, the additional values determined in step 218 may each be a number in a specified range such as [0,1].

In step 220, trend identification tool 104 (see FIG. 1) performs an additional search of repository 108 (see FIG. 1) that includes determining and retrieving an additional set of comparison heat maps, each having initial comparison area(s) and additional comparison area(s) that are similar to initial target area(s) 110 (see FIG. 1) and additional target area(s) 116 (see FIG. 1), respectively, based on the additional values determined in step 218.

The specified threshold value that determines whether additional comparison area(s) of a heat map retrieved from repository 108 (see FIG. 1) are similar to additional target area(s) 116 (see FIG. 1) may be defined and stored in a computer data storage unit prior to step 220.

In step 222 and based on the additional values determined in step 218, trend identification tool 104 (see FIG. 1) determines an additional ranking of the additional set of comparison heat maps retrieved in step 220.

For example, each comparison heat map in the additional set of comparison heat maps retrieved in step 220 has a corresponding additional value determined in step 218 that includes the aforementioned pair of values. In the example of this paragraph, trend identification tool 104 (see FIG. 1) determines the averages (e.g., finds the mean) of the values in each pair, and subsequently ranks the comparison heat maps in the additional set of comparison heat maps from the greatest average to the least average.

In step 224, trend identification tool 104 (see FIG. 1) initiates an additional display of the additional set of comparison heat maps determined by the additional search performed in step 220, where the additional display presents the additional set of comparison heat maps in an order based on the additional ranking determined in step 222.

In step 226, trend identification tool 104 (see FIG. 1) initiates the additional display to also include indications of the additional values determined in step 218 that correspond to the comparison heat maps in the additional set of comparison heat maps determined in step 220. Step 226 may optionally include trend identification tool 104 (see FIG. 1) initiating the additional display to further include other information related to each of the comparison heat maps in the additional set of comparison heat maps. The other information may include information about the data that specifies the colors in the comparison heat maps, such as a date and time at which the data was recorded. In one embodiment, prior to step 202, computer system 102 (see FIG. 1) or another computer system records the data that specifies the colors in the comparison heat maps stored in repository 108 (see FIG. 1) and further records other information related to the comparison heat maps including the date and time at which the aforementioned data was recorded.

The additional search results 120 (see FIG. 1) include the additional set of comparison heat maps in the order indicated by the ranking determined in step 222, along with indications of the additional values corresponding to each of the comparison heat maps in the additional set of comparison heat maps. As one example, the additional search results include a ranked list of the comparison heat maps in the additional set of comparison heat maps, where each comparison heat map in the list is accompanied by its corresponding two percentages (i.e., a percentage indicating how closely initial comparison area(s) match the initial target area(s) 110 (see FIG. 1) and a percentage indicating how closely additional comparison area(s) match the additional target area(s) (see FIG. 1)). As another example, the additional search results include a ranked list of the comparison heat maps in the additional set of comparison heat maps, where each comparison heat map in the list is accompanied by one or more graphical indicators that indicate the aforementioned two percentages indicating how closely the comparison areas match to the respective target areas.

Subsequent to steps 224 and 226, the additional search results 120 (see FIG. 1) are displayed on a display device (not shown) coupled to computer system 102 (see FIG. 1) or coupled to another computer (not shown).

Hereinafter, the additional set of heat maps whose display is initiated in step 224, the indications of the additional values whose display is initiated in step 226, and the aforementioned other information whose display is initiated in step 226 are collectively referred to as "the information displayed in steps 224 and 226." In step 228, if a user or computer system 102 (see FIG. 1) determines that the information displayed in steps 224 and 226 does not allow an identification of a trend in the data that specifies the heat maps in repository 108 (see FIG. 1), then the No branch of step 228 is followed and the process of FIGS. 2A-2B loops back to step 214 in FIG. 2A. If a user or computer system 102 (see FIG. 1) determines in step 228 that the information displayed in steps 224 and 226 allows an identification of the aforementioned trend, then the Yes branch of step 228 is followed and the process continues with step 230.

In step 230, a user or computer system 102 (see FIG. 1) identifies the aforementioned trend in the data that specifies heat maps in repository 108 (see FIG. 1) based on a review of the information displayed in steps 224 and 226. The trend identified in step 230 may relate the initial and additional target areas 110, 116 (see FIG. 1) of the primary heat map 106 (see FIG. 1) and may relate the initial and additional comparison areas of the most recently displayed additional set of comparison heat maps. In response to identifying the trend in step 230, the user or computer system 102 (see FIG. 1) may identify a root cause of the initial condition of interest specified by the initial target area(s) 110 (see FIG. 1) and perform an action to modify the initial condition of interest (e.g., repair the problem specified by the initial target area(s)). Following step 230, the process of FIGS. 2A-2B ends at step 232.

Trend Identification Example

An example of using the process of FIGS. 2A-2B is depicted in FIGS. 3A-3E and FIGS. 4A-4D. The patterns in each block in FIGS. 3A-3E and FIGS. 4A-4D correspond to colors that are displayed in heat maps. In this example, the patterns that have darker lines indicate shades of red and yellow that are displayed in heat maps, which indicate problems in performance of the associated hardware. The patterns that have lighter lines indicate shades of green that are displayed in heat maps, which indicates no problems in the performance of associated hardware. For instance, all blocks in area 300-1 of heat map 300 in FIG. 3A have darker lines (i.e., indicating problems), except for the block in the eighth row and seventh column of area 300-1, which has lighter lines (i.e., indicating an absence of a problem).

In this example, a Level 3 Service Analyst for a large enterprise corporation XYZ has been assigned to look at an intermittent problem experienced by servers that are responsible for Risk Management applications and services. The corporation XYZ uses heat maps to monitor the performance of hardware, including the servers that are experiencing the intermittent problem. The Service Analysis is trying to look through the heat maps of the recent past to see if there is any pattern to the problem. The Service Analyst believes that if a consistent pattern to the problem exists, then the pattern may help identify the root cause of the problem.

Figure 3A:
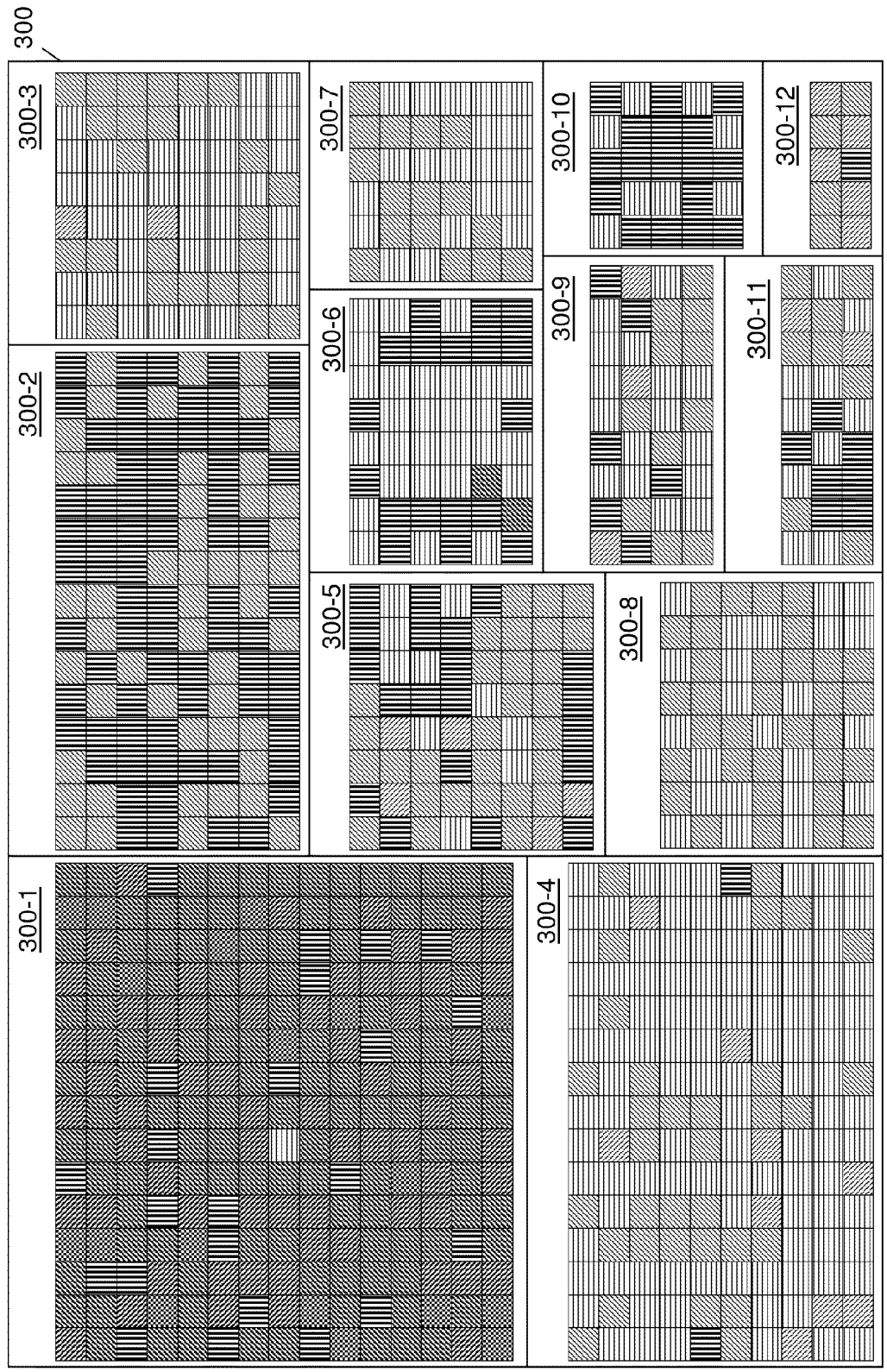
FIG. 3A is an example of a primary heat map used in the process of FIGS. 2A-2B, in accordance with embodiments of the present invention.

FIG. 3A depicts a heat map 300 that represents the monitored hardware performance data at a time when the problem most recently occurred. The Service Analyst decides to use heat map 300 as the primary heat map 106 (see FIG. 1) that is to be used in the process of FIGS. 2A-2B. Computer system 102 (see FIG. 1) receives heat map 300 identified as the primary heat map.

Primary heat map 300 includes areas 300-1, 300-2, 300-3, 300-4, 300-5, 300-6, 300-7, 300-8, 300-9, 300-10, 300-11 and 300-12, each of which includes colors that represent the performance of hardware used by corporation XYZ. Area 300-1 represents the performance of the servers that are experiencing the problem (i.e., the servers responsible for Risk Management applications and services). Areas 300-2 through 300-8 represent the performances of other servers that are responsible for other applications and services used by corporation XYZ. Areas 300-9 through 300-12 respectively represent first through fourth groups of routers used by corporation XYZ.

The Service Analyst uses a user interface provided by trend identification tool 104 (see FIG. 1) that allows him to look for trends in the data of the primary heat map 300 and the heat maps stored in repository 108 (see FIG. 1). Trend identification tool 104 (see FIG. 1) allows the Service Analyst to focus in on a specific area in the primary heat map 300 and find other heat maps in repository 108 (see FIG. 1) that have a similar looking pattern of colors. The user interface allows the Service Analyst to select a method of matching. In this example, the Service Analyst selects the matching method by which comparison area(s) are matched to target area(s) by color composition. The user interface also allows the Service Analyst to select the number of target areas. In this example, the Service Analyst selects "1" as the number of target areas. Furthermore, the user interface provides a user-configurable rectangular shape that can be dragged to the primary heat map 300 and re-sized as needed.

The Service Analyst drags the rectangular shape to primary heat map 300 and positions it over the area of interest (i.e., over a portion of area 300-1).

Figure 3B:
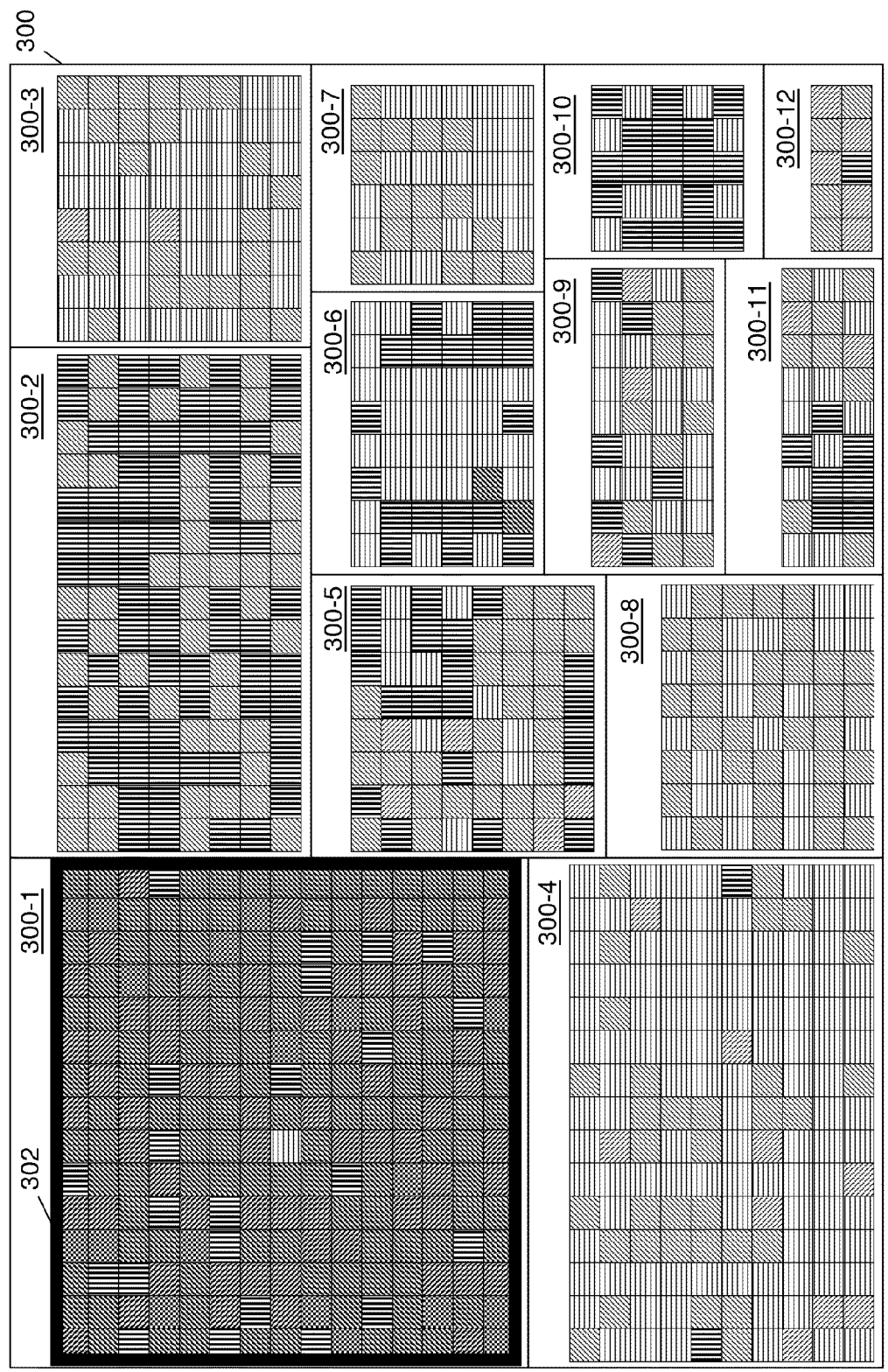
FIG. 3B is the primary heat map of FIG. 3A with an initial target area that is used in the process of FIGS. 2A-2B, in accordance with embodiments of the present invention.

The Service Analyst re-sizes the rectangular shape so that the borders of the shape overlay the borders of area 300-1, which is the entire area of interest that represents the performance of the servers that provide Risk Management applications and services for corporation XYZ. FIG. 3B depicts primary heat map 300 having areas 300-1, 300-2, 300-3, 300-4, 300-5, 300-6, 300-7, 300-8, 300-9, 300-10, 300-11 and 300-12, which are described above relative to FIG. 3A. FIG. 3B also depicts the dragged and re-sized rectangular shape 302 that indicates the initial target area of primary heat map 300. That is, the initial target area is the entire area 300-1. Via the user interface provided by trend identification tool 104 (see FIG. 1), computer system 102 (see FIG. 1) receives the initial target area 300-1 of primary heat map 300 (see step 202 in FIG. 2A).

The Service Analyst activates a "Search" button on the user interface to start an initial search of heat maps from other time periods to find heat maps that have a comparison area whose pattern of colors is similar to the pattern of colors in the initial target area 300-1 indicated by rectangular shape 302. The initial search searches repository 108 (see FIG. 1) and includes steps 204, 206 and 208 in FIG. 2A.

The initial search sifts through recently stored heat maps in repository 108 (see FIG. 1) and looks for and retrieves heat maps and related information (i.e., date and time of the hardware performance data specified by the colors of a retrieved heat map, and a percent match which indicates a percentage of the color composition of a comparison area in the retrieved heat map that matches the color composition of the initial target area of the primary heat map).

The retrieved heat maps each have a comparison area that is similar in color composition to the color composition of the initial target area 300-1 (see FIG. 3B). The comparison area in each heat map in repository 108 (see FIG. 1) has a position in the retrieved heat map that corresponds to the position of the initial target area 300-1 (see FIG. 3B) in the primary heat map 300 (see FIG. 3B). The percent match associated with each retrieved heat map indicates how similar the color composition of the comparison area in the retrieved heat map is to the color composition of the initial target area 300-1 (see FIG. 3B) of the primary heat map 300 (see FIG. 3B). A greater percent match indicates a greater degree of similarity between the color composition of the comparison area and the color composition of the initial target area.

Subsequent to retrieving the similar heat maps, the results of the initial search are generated to include a ranked, scrollable list of the retrieved heat maps and the related information. The scrollable list is ordered by a ranking of the retrieved heat maps, so that the heat map associated with the greatest percent match is first in the list, the heat map associated with the next greatest percent match is second in the list, etc. In this example, the scrollable list has more than three results of the initial search, but only the first three results are shown in FIGS. 3C, 3D and 3E (see steps 210 and 212 in FIG. 2A).

Figure 3C:
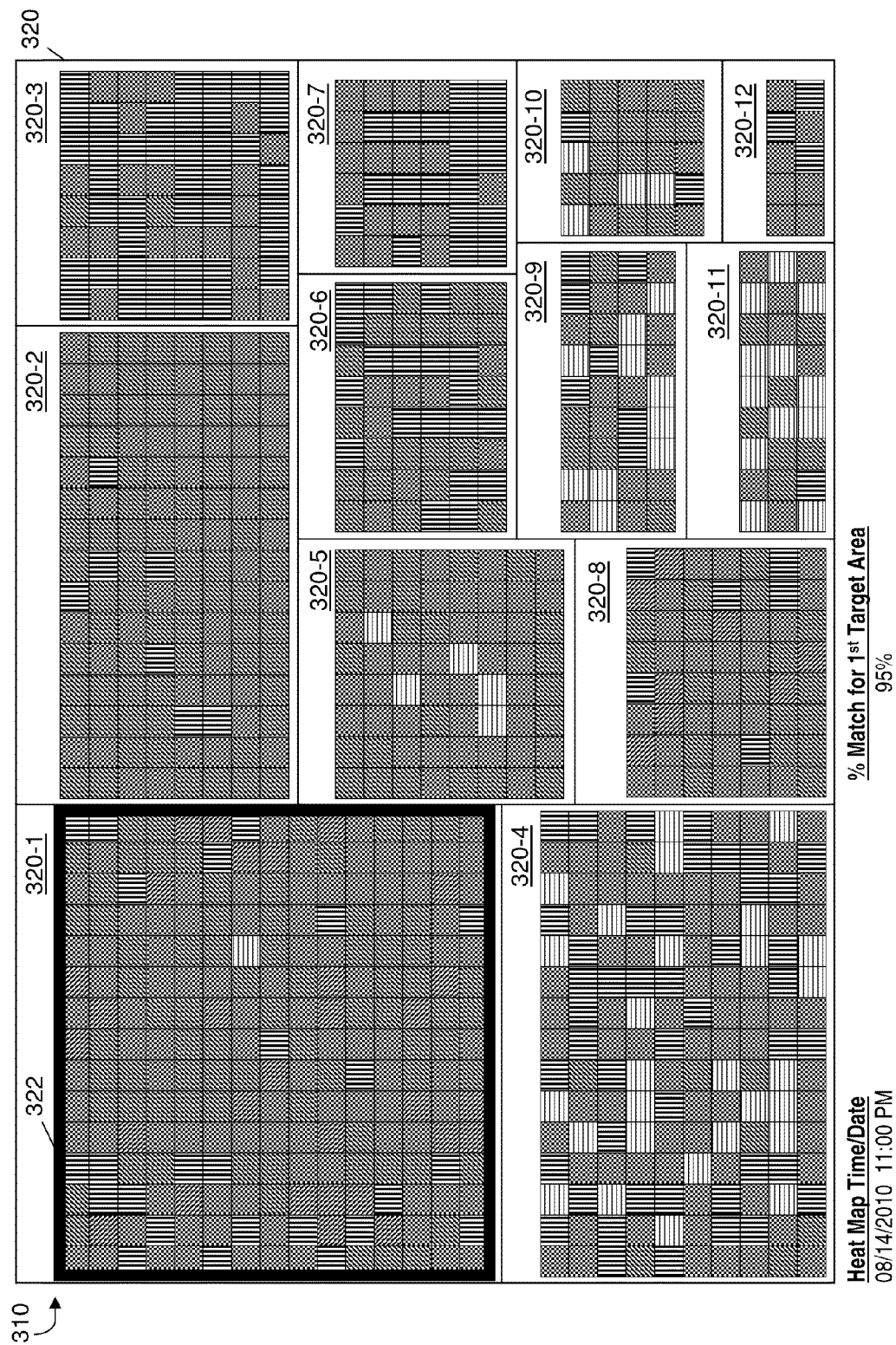
FIGS. 3C-3E depict sample ordered results of an initial search performed in the process of FIGS. 2A-2B, in accordance with embodiments of the present invention.

FIG. 3C depicts the highest ranked result 310 of the initial search of repository 108 (see FIG. 1). Result 310 includes heat map 320 retrieved from repository 108 (see FIG. 1), which includes areas 320-1, 320-2, 320-3, 320-4, 320-5, 320-6, 320-7, 320-8, 320-9, 320-10, 320-11 and 320-12, which correspond to areas 300-1, 300-2, 300-3, 300-4, 300-5, 300-6, 300-7, 300-8, 300-9, 300-10, 300-11 and 300-12 (see FIGS. 3A and 3B), respectively, and represent the performance of the hardware specified by the corresponding areas in FIGS. 3A and 3B. Result 310 also includes the time and date at which the hardware performance data corresponding to the colors of heat map 320 was recorded (i.e., "Aug. 14, 2010 11:00 PM"), and a percentage that indicates how closely a comparison area 320-1 indicated by outline 322 in heat map 320 matches initial target area 300-1 (see FIG. 3B) (i.e., 95%).

Figure 3D:
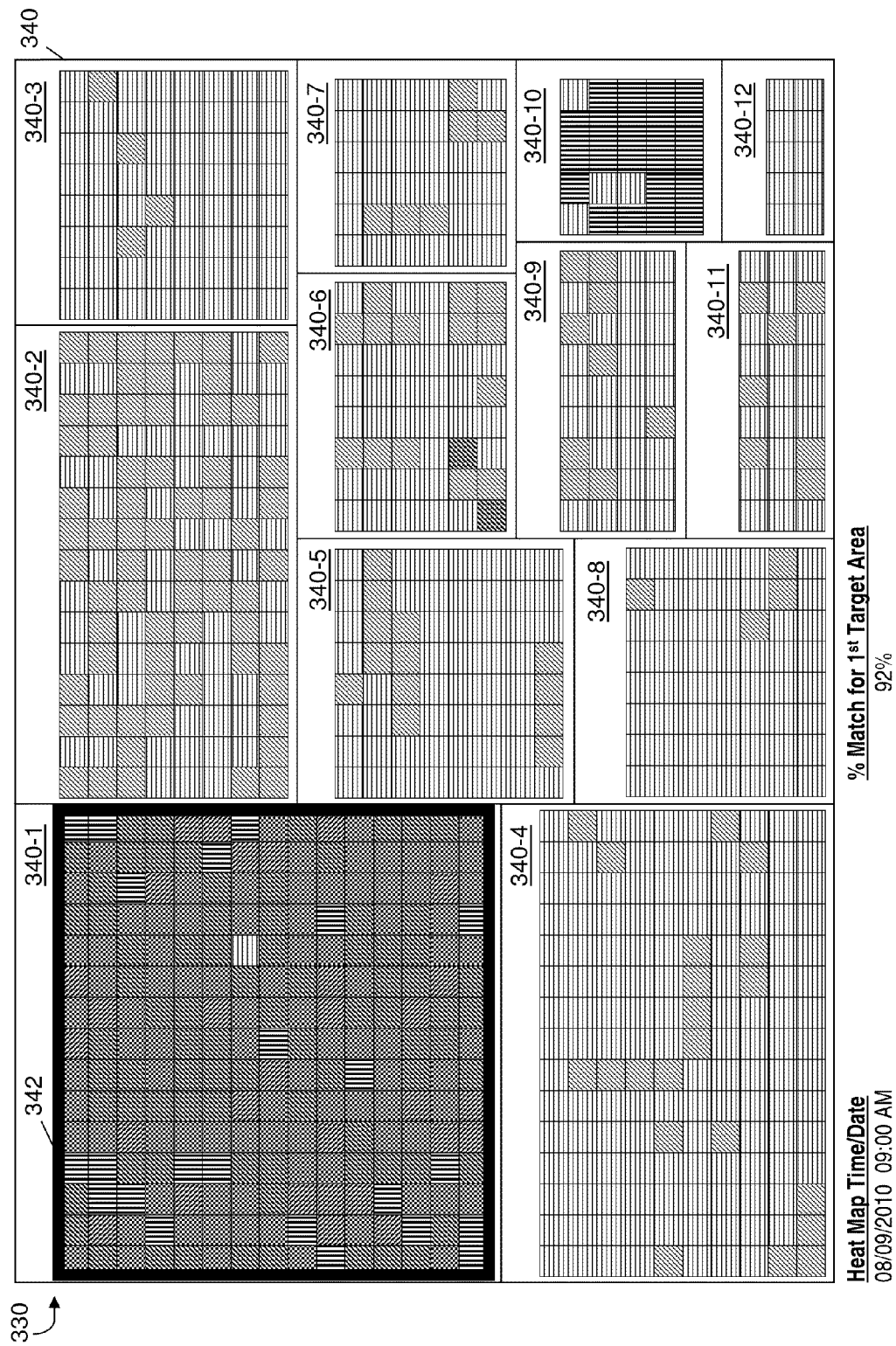

FIG. 3D depicts the second highest ranked result 330 of the initial search of repository 108 (see FIG. 1). Result 330 includes heat map 340 retrieved from repository 108 (see FIG. 1), which includes areas 340-1, 340-2, 340-3, 340-4, 340-5, 340-6, 340-7, 340-8, 340-9, 340-10, 340-11 and 340-12, which correspond to areas 300-1, 300-2, 300-3, 300-4, 300-5, 300-6, 300-7, 300-8, 300-9, 300-10, 300-11 and 300-12 (see FIGS. 3A and 3B), respectively, and represent the performance of the hardware specified by the corresponding areas in FIGS. 3A and 3B. Result 330 also includes the time and date at which the hardware performance data corresponding to the colors of heat map 340 was recorded (i.e., "Aug. 9, 2010 09:00 AM"), and a percentage that indicates how closely a comparison area 340-1 indicated by outline 342 in heat map 340 matches initial target area 300-1 (see FIG. 3B) (i.e., 92%).

Figure 3E:
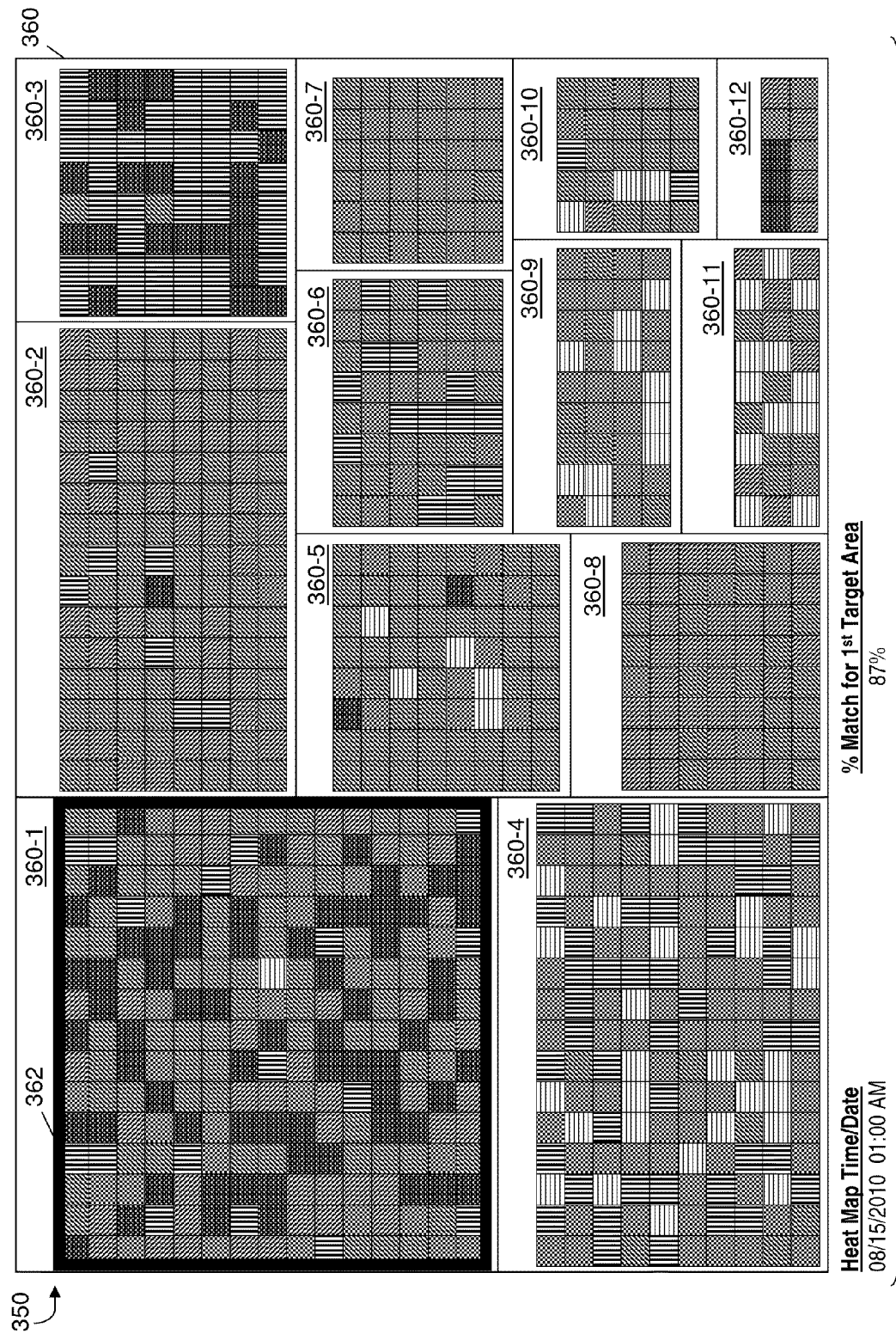

FIG. 3E depicts the third highest ranked result 350 of the initial search of repository 108 (see FIG. 1). Result 350 includes heat map 360 retrieved from repository 108 (see FIG. 1), which includes areas 360-1, 360-2, 360-3, 360-4, 360-5, 360-6, 360-7, 360-8, 360-9, 360-10, 360-11 and 360-12, which correspond to areas 300-1, 300-2, 300-3, 300-4, 300-5, 300-6, 300-7, 300-8, 300-9, 300-10, 300-11 and 300-12 (see FIGS. 3A and 3B), respectively, and represent the performance of the hardware specified by the corresponding areas in FIGS. 3A and 3B. Result 350 also includes the time and date at which the hardware performance data corresponding to the colors of heat map 360 was recorded (i.e., "Aug. 15, 2010 01:00 AM"), and a percentage that indicates how closely a comparison area 360-1 indicated by outline 362 in heat map 360 matches initial target area 300-1 (see FIG. 3B) (i.e., 87%).

The Service Analyst reviews the results of the initial search and notes that the results are equivocal because there are apparently a number of results that do not have a clear trend and are not going to be helpful in determining the root cause of the problem. For example, heat map 320 (see FIG. 3C) includes a great majority of blocks in all areas having colors that indicate a problem, and therefore, heat map 320 probably depicts a time when the entire computer network of corporation XYZ was experiencing problems or a maintenance period.

As the Service Analyst reviews results in the scrollable list that are not shown in FIGS. 3C, 3D and 3E, the Service Analyst also notes that a number of heat maps in the results, as a whole, resemble heat map 340 (see FIG. 3D). That is, the other heat maps have areas corresponding to areas 340-1 and 340-10 (see FIG. 3D) that have colors indicating problems, but the great majority of the colors in other areas indicate no problems. Area 340-10 in FIG. 3D indicates the performance of the second group of routers. Thus, the Service Analyst hypothesizes that when the Risk Management servers are having problems, there also seems to be problems with the second group of routers. To test the hypothesis, the Service Analyst identifies an additional comparison area and introduces an additional target area (see step 214 in FIG. 2A).

The Service Analyst uses the aforementioned user interface provided by trend identification tool 104 (see FIG. 1) to retain the previously selected method of matching that matches comparison area(s) to target area(s) by color composition, and to select "2" as the number of target areas. Furthermore, the user interface provides two user-configurable rectangular shapes that can be dragged to the primary heat map 300 and re-sized as needed.

Figure 4A:
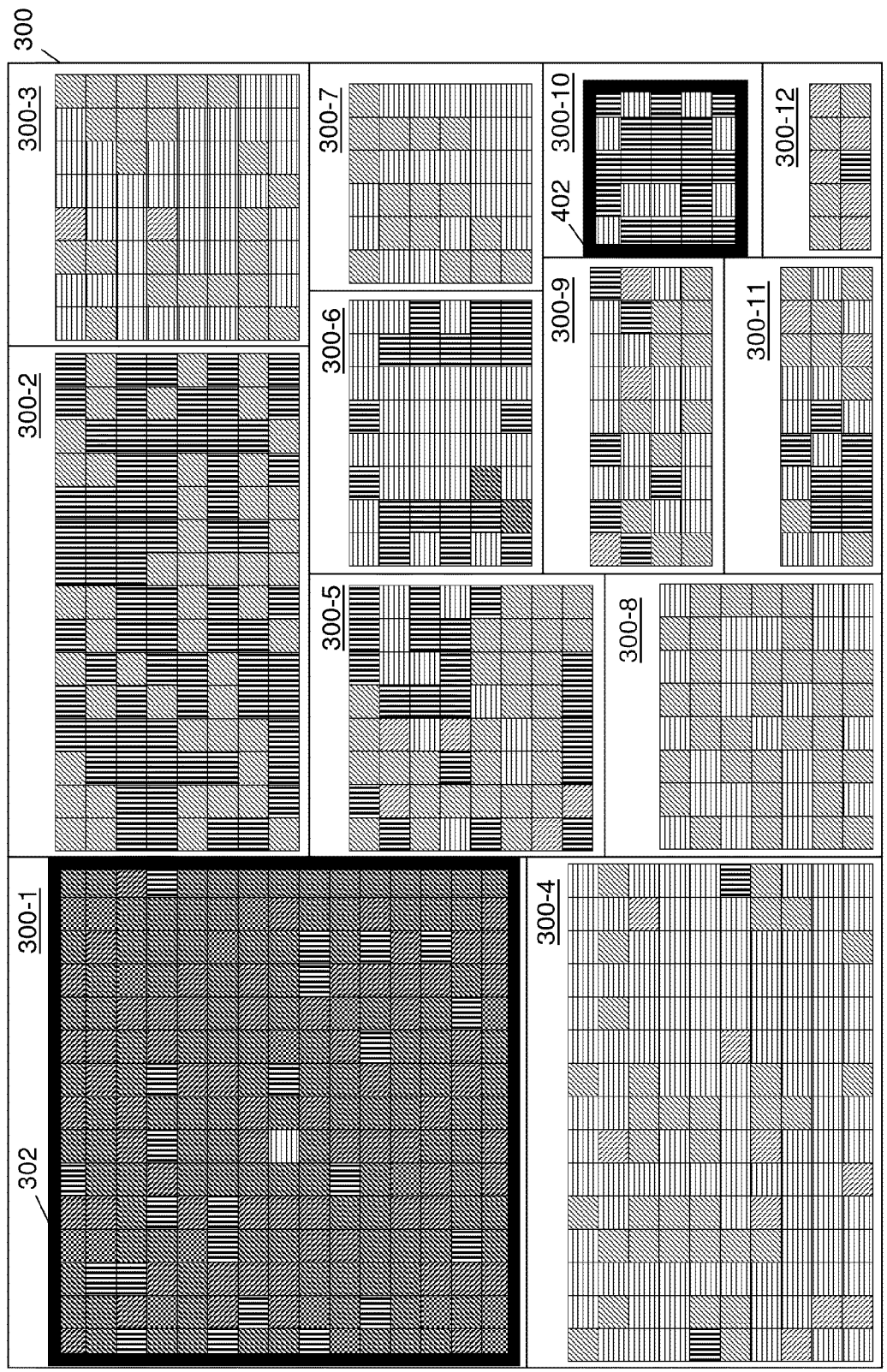
FIG. 4A is the primary heat map of FIG. 3B with an additional target area that is used in the process of FIGS. 2A-2B, in accordance with embodiments of the present invention.

FIG. 4A depicts primary heat map 300 having areas 300-1, 300-2, 300-3, 300-4, 300-5, 300-6, 300-7, 300-8, 300-9, 300-10, 300-11 and 300-12, as described above relative to FIGS. 3A and 3B. The first rectangular shape provided by the user interface is shape 302 positioned over area 300-1, as positioned previously as shown in FIG. 3B. The Service Analyst drags the second rectangular shape to primary heat map 300 and positions it over a second area of interest (i.e., over a portion of area 300-10).

The Service Analyst re-sizes the second rectangular shape so that the borders of the shape overlay the borders of area 300-10, which is the entire area of interest that represents the performance of the second group of routers used by corporation XYZ. FIG. 4A also depicts the dragged and re-sized rectangular shape 402, which indicates an additional target area of primary heat map 300. That is, the additional target area is the entire area 300-10, which is bordered by the dragged and re-sized second shape 402. Via the user interface provided by trend identification tool 104 (see FIG. 1), computer system 102 (see FIG. 1) receives the additional target area 300-10 of primary heat map 300 (see step 216 in FIG. 2A).

The Service Analyst activates a "Search" button on the user interface to start an additional search of heat maps from other time periods to find heat maps that have an initial comparison area whose pattern of colors is similar to the pattern of colors in the initial target area 300-1 indicated by rectangular shape 302, and have an additional comparison area whose pattern of colors is similar to the pattern of colors in the additional target area 300-10. The additional search searches repository 108 (see FIG. 1) and includes steps 218, 220 and 222 in FIG. 2B.

The additional search sifts through recently stored heat maps in repository 108 (see FIG. 1) and looks for and retrieves heat maps and related information for heat maps that have initial and additional comparison areas that are the most similar to the initial and additional target areas, respectively, of primary heat map 300. Because there are two target areas in the additional search, the related information includes two percent matches. That is, an initial percent match indicates a percentage of the color composition of the initial comparison area of a retrieved heat map that matches the color composition of the initial target area 300-1 of primary heat map 300. Further, an additional percent match indicates a percentage of the color composition of the additional comparison area of a retrieved heat map that matches the color composition of the additional target area 300-10 of primary heat map 300. A greater average of the two percent matches resulting from the additional search indicates a greater degree of similarity between the color composition of the comparison areas and the color composition of the target areas in primary heat map 300. The related information also includes the date and time at which the hardware performance data that specifies the colors of the retrieved heat map was recorded.

The heat maps retrieved by the additional search each has an initial comparison area that is similar in color composition to the color composition of the initial target area 300-1 (see FIG. 4A). The initial comparison area in each heat map in repository 108 (see FIG. 1) has a position in the retrieved heat map that corresponds to the position of the initial target area 300-1 (see FIG. 4A) in the primary heat map 300 (see FIG. 4A). Furthermore, each of the heat maps retrieved by the additional search has an additional comparison area that is similar in color composition to the color composition of the additional target area 300-10 (see FIG. 4A). The additional comparison area in each heat map in repository 108 (see FIG. 1) has a position in the retrieved heat map that corresponds to the position of the additional target area 300-1 (see FIG. 4A) in the primary heat map 300 (see FIG. 4A).

Subsequent to retrieving the similar heat maps in the additional search, the results of the additional search are generated to include an additional ranked, scrollable list of the retrieved heat maps and the related information. The additional scrollable list is ordered by a ranking of the retrieved heat maps, so that the heat map associated with the greatest average of the initial and additional percent matches is first in the additional list, the heat map associated with the next greatest average of the initial and additional percent matches is second in the additional list, etc. In this example, the additional scrollable list has more than three results of the additional search, but only the first three results are shown in FIGS. 4B, 4C and 4D (see steps 224 and 226 in FIG. 2B).

Figure 4B:
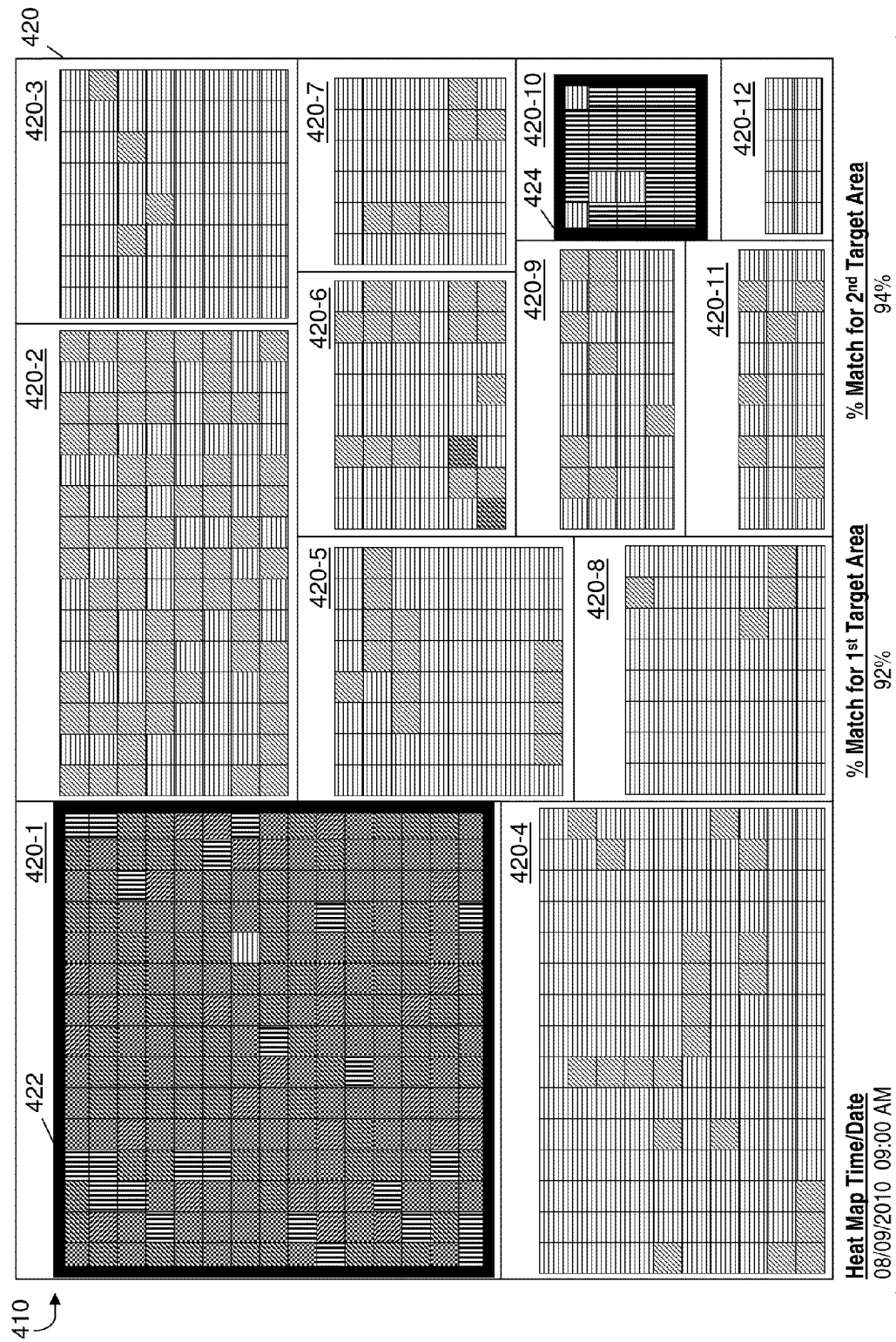
FIGS. 4B-4D depict sample ordered results of an additional search performed in the process of FIGS. 2A-2B, in accordance with embodiments of the present invention.

FIG. 4B depicts the highest ranked result 410 of the additional search of repository 108 (see FIG. 1) based on the initial and additional target areas 300-1 and 300-10 (see FIG. 4A). Result 410 includes heat map 420 retrieved from repository 108 (see FIG. 1), which includes areas 420-1, 420-2, 420-3, 420-4, 420-5, 420-6, 420-7, 420-8, 420-9, 420-10, 420-11 and 420-12, which correspond to areas 300-1, 300-2, 300-3, 300-4, 300-5, 300-6, 300-7, 300-8, 300-9, 300-10, 300-11 and 300-12 (see FIG. 4A), respectively, and represent the performance of the hardware specified by the corresponding areas in FIG. 4A. Result 410 also includes the time and date at which the hardware performance data corresponding to the colors of heat map 420 was recorded (i.e., "Aug. 9, 2010 09:00 AM"), an initial percentage (i.e., initial percent match) that indicates how closely an initial comparison area 420-1 indicated by outline 422 in heat map 420 matches initial target area 300-1 (see FIG. 4A) (i.e., 92%), and an additional percentage (i.e., additional percent match) that indicates how closely an additional comparison area 420-10 indicated by outline 424 matches additional target area 300-10 (see FIG. 4A) (i.e., 94%). The average percentage used for ranking heat map 420 as the highest ranked heat map in the additional list is (92%+94%)/2 or 93%.

Figure 4C:
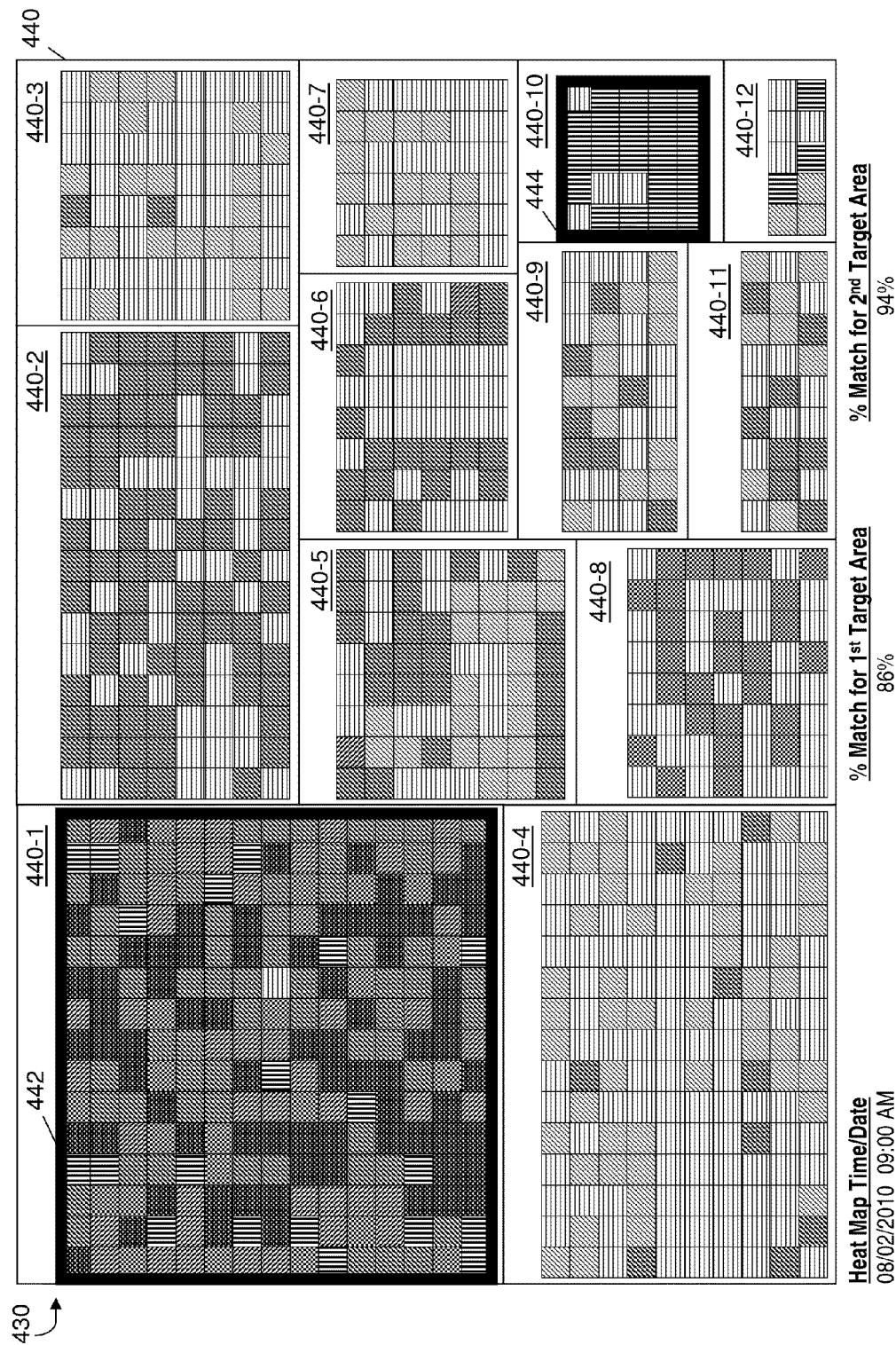

FIG. 4C depicts the second highest ranked result 430 of the additional search of repository 108 (see FIG. 1). Result 430 includes heat map 440 retrieved from repository 108 (see FIG. 1), which includes areas 440-1, 440-2, 440-3, 440-4, 440-5, 440-6, 440-7, 440-8, 440-9, 440-10, 440-11 and 440-12, which correspond to areas 300-1, 300-2, 300-3, 300-4, 300-5, 300-6, 300-7, 300-8, 300-9, 300-10, 300-11 and 300-12 (see FIG. 4A), respectively, and represent the performance of the hardware specified by the corresponding areas in FIG. 4A. Result 430 also includes the time and date at which the hardware performance data corresponding to the colors of heat map 440 was recorded (i.e., "Aug. 9, 2010 09:00 AM"), an initial percentage (i.e., initial percent match) that indicates how closely an initial comparison area 440-1 indicated by outline 442 in heat map 440 matches initial target area 300-1 (see FIG. 4A) (i.e., 86%), and an additional percentage (i.e., additional percent match) that indicates how closely an additional comparison area 440-10 indicated by outline 444 matches additional target area 300-10 (see FIG. 4A) (i.e., 94%). The average percentage used for ranking heat map 440 as the second highest ranked heat map in the additional list is (86%+94%)/2 or 90%.

Figure 4D:
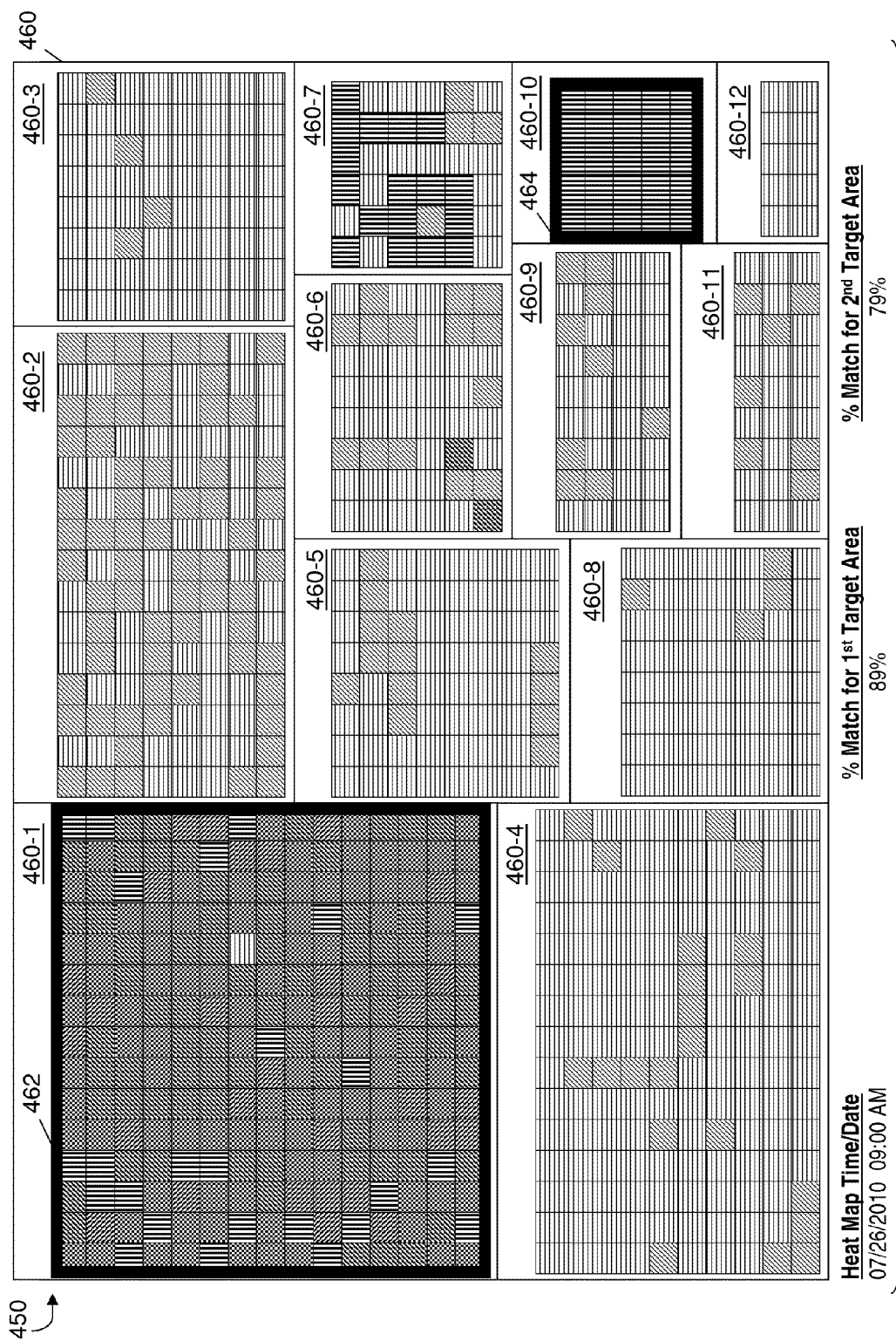

FIG. 4D depicts the third highest ranked result 450 of the additional search of repository 108 (see FIG. 1). Result 450 includes heat map 460 retrieved from repository 108 (see FIG. 1), which includes areas 460-1, 460-2, 460-3, 460-4, 460-5, 460-6, 460-7, 460-8, 460-9, 460-10, 460-11 and 460-12, which correspond to areas 300-1, 300-2, 300-3, 300-4, 300-5, 300-6, 300-7, 300-8, 300-9, 300-10, 300-11 and 300-12 (see FIG. 4A), respectively, and represent the performance of the hardware specified by the corresponding areas in FIG. 4A. Result 450 also includes the time and date at which the hardware performance data corresponding to the colors of heat map 460 was recorded (i.e., "Jul. 26, 2010 09:00 AM"), an initial percentage (i.e., initial percent match) that indicates how closely an initial comparison area 460-1 indicated by outline 462 in heat map 460 matches initial target area 300-1 (see FIG. 4A) (i.e., 89%), and an additional percentage (i.e., additional percent match) that indicates how closely an additional comparison area 460-10 indicated by outline 464 matches additional target area 300-10 (see FIG. 4A) (i.e., 79%). The average percentage used for ranking heat map 460 as the third highest ranked heat map in the additional list is (89%+79%)/2 or 84%.

Based on the results of the additional search, the Service Analyst identifies a trend using the following information that would have been difficult to obtain through other methods. The Service Analyst has found that there often appears to be a correlated problem with both the Risk Management servers and the second group of routers. Also, the correlated problem appears to happen in a 9:00 AM timeframe based on the times included in the results of the additional search. The Service Analyst figures out what is happening at 9:00 AM that is causing the network hardware to have the identified problem and then takes an action to solve the problem (see step 228 in FIG. 2B).

Computer System

Figure 5:
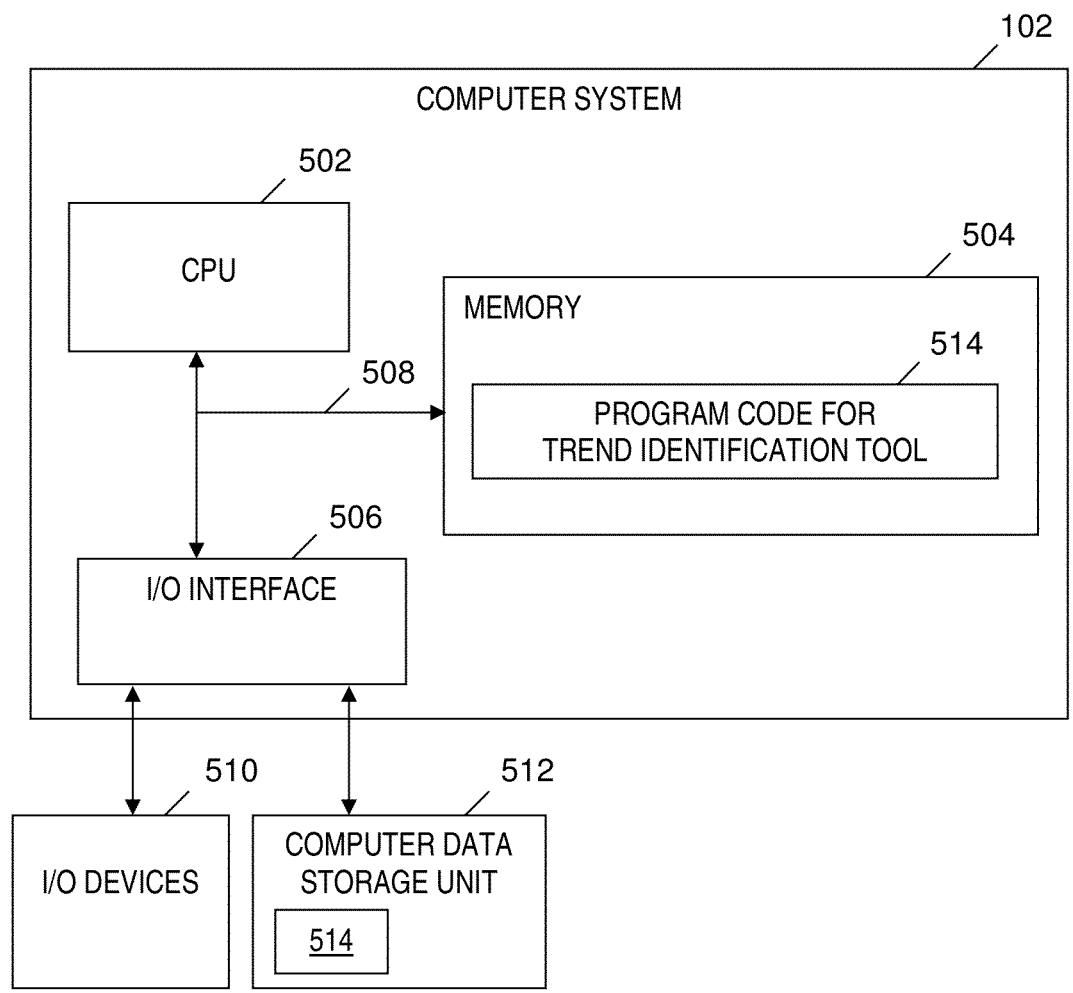
FIG. 5 is a block diagram of a computer system that is included in the system of FIG. 1 and that implements the process of FIGS. 2A-2B, in accordance with embodiments of the present invention.

FIG. 5 is a block diagram of a computer system that is included in the system of FIG. 1 and that implements the process of FIGS. 2A-2B, in accordance with embodiments of the present invention. Computer system 102 generally comprises a central processing unit (CPU) 502, a memory 504, an input/output (I/O) interface 506, and a bus 508. Further, computer system 102 is coupled to I/O devices 510 and a computer data storage unit 512. CPU 502 performs computation and control functions of computer system 102, including carrying out instructions included in program code 514 to perform a method of identifying trends in heat map data, where the instructions are carried out by CPU 502 via memory 504. CPU 502 may comprise a single processing unit, or be distributed across one or more processing units in one or more locations (e.g., on a client and server).

Memory 504 may comprise any known computer-readable storage medium, which is described below. In one embodiment, cache memory elements of memory 504 provide temporary storage of at least some program code (e.g., program code 514) in order to reduce the number of times code must be retrieved from bulk storage while instructions of the program code are carried out. Moreover, similar to CPU 502, memory 504 may reside at a single physical location, comprising one or more types of data storage, or be distributed across a plurality of physical systems in various forms. Further, memory 504 can include data distributed across, for example, a local area network (LAN) or a wide area network (WAN).

I/O interface 506 comprises any system for exchanging information to or from an external source. I/O devices 510 comprise any known type of external device, including a display device (e.g., monitor), keyboard, mouse, printer, speakers, handheld device, facsimile, etc. Bus 508 provides a communication link between each of the components in computer system 102, and may comprise any type of transmission link, including electrical, optical, wireless, etc.

I/O interface 506 also allows computer system 102 to store information (e.g., data or program instructions such as program code 514) on and retrieve the information from computer data storage unit 512 or another computer data storage unit (not shown). Computer data storage unit 512 may comprise any known computer-readable storage medium, which is described below. For example, computer data storage unit 512 may be a non-volatile data storage device, such as a magnetic disk drive (i.e., hard disk drive) or an optical disc drive (e.g., a CD-ROM drive which receives a CD-ROM disk).

Memory 504 and/or storage unit 512 may store computer program code 514 that includes instructions that are carried out by CPU 502 via memory 504 to identify a trend in heat map data. Although FIG. 5 depicts memory 504 as including program code 514, the present invention contemplates embodiments in which memory 504 does not include all of code 514 simultaneously, but instead at one time includes only a portion of code 514.

Further, memory 504 may include other systems not shown in FIG. 5, such as an operating system (e.g., Linux) that runs on CPU 502 and provides control of various components within and/or connected to computer system 102.

Storage unit 512 and/or one or more other computer data storage units (not shown) that are coupled to computer system 102 may store heat map data repository 108 (see FIG. 1) and/or any parameter values, such as threshold value(s) or tolerance level(s) needed to determine whether a comparison area is similar to a target area in primary heat map 106 (see FIG. 1).

As will be appreciated by one skilled in the art, the present invention may be embodied as a system, method or computer program product. Accordingly, an aspect of an embodiment of the present invention may take the form of an entirely hardware aspect, an entirely software aspect (including firmware, resident software, micro-code, etc.) or an aspect combining software and hardware aspects that may all generally be referred to herein as a "module".

Furthermore, an embodiment of the present invention may take the form of a computer program product embodied in one or more computer-readable medium(s) (e.g., memory 504 and/or computer data storage unit 512) having computer-readable program code (e.g., program code 514) embodied or stored thereon.

Any combination of one or more computer-readable mediums (e.g., memory 504 and computer data storage unit 512) may be utilized. The computer-readable medium may be a computer-readable signal medium or a computer-readable storage medium. In one embodiment the computer-readable storage medium is a computer-readable storage device or computer-readable storage apparatus. A computer-readable storage medium may be, for example, but not limited to, an electronic, magnetic, optical, electromagnetic, infrared or semiconductor system, apparatus, device or any suitable combination of the foregoing. A non-exhaustive list of more specific examples of the computer-readable storage medium includes: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be a tangible medium that can contain or store a program (e.g., program 514) for use by or in connection with a system, apparatus, or device for carrying out instructions.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with a system, apparatus, or device for carrying out instructions.

Program code (e.g., program code 514) embodied on a computer-readable medium may be transmitted using any appropriate medium, including but not limited to wireless, wireline, optical fiber cable, RF, etc., or any suitable combination of the foregoing.

Computer program code (e.g., program code 514) for carrying out operations for aspects of the present invention may be written in any combination of one or more programming languages, including an object oriented programming language such as Java®, Smalltalk, C++ or the like and conventional procedural programming languages, such as the "C" programming language or similar programming languages. Instructions of the program code may be carried out entirely on a user's computer, partly on the user's computer, as a stand-alone software package, partly on the user's computer and partly on a remote computer or entirely on the remote computer or server, where the aforementioned user's computer, remote computer and server may be, for example, computer system 102 or another computer system (not shown) having components analogous to the components of computer system 102 included in FIG. 5. In the latter scenario, the remote computer may be connected to the user's computer through any type of network (not shown), including a LAN or a WAN, or the connection may be made to an external computer (e.g., through the Internet using an Internet Service Provider).

Aspects of the present invention are described herein with reference to flowchart illustrations (e.g., FIGS. 2A-2B) and/or block diagrams of methods, apparatus (systems) (e.g., FIG. 1 and FIG. 5), and computer program products according to embodiments of the invention. It will be understood that each block of the flowchart illustrations and/or block diagrams, and combinations of blocks in the flowchart illustrations and/or block diagrams, can be implemented by computer program instructions (e.g., program code 514). These computer program instructions may be provided to one or more hardware processors (e.g., CPU 502) of a general purpose computer, special purpose computer, or other programmable data processing apparatus to produce a machine, such that the instructions, which are carried out via the processor(s) of the computer or other programmable data processing apparatus, create means for implementing the functions/acts specified in the flowchart and/or block diagram block or blocks.

These computer program instructions may also be stored in a computer-readable medium (e.g., memory 504 or computer data storage unit 512) that can direct a computer (e.g., computer system 102), other programmable data processing apparatus, or other devices to function in a particular manner, such that the instructions (e.g., program 514) stored in the computer-readable medium produce an article of manufacture including instructions which implement the function/act specified in the flowchart and/or block diagram block or blocks.

The computer program instructions may also be loaded onto a computer (e.g., computer system 102), other programmable data processing apparatus, or other devices to cause a series of operational steps to be performed on the computer, other programmable apparatus, or other devices to produce a computer implemented process such that the instructions (e.g., program 514) which are carried out on the computer, other programmable apparatus, or other devices provide processes for implementing the functions/acts specified in the flowchart and/or block diagram block or blocks.

Any of the components of an embodiment of the present invention can be deployed, managed, serviced, etc. by a service provider that offers to deploy or integrate computing infrastructure with respect to identifying a trend in heat map data. Thus, an embodiment of the present invention discloses a process for supporting computer infrastructure, wherein the process comprises providing at least one support service for at least one of integrating, hosting, maintaining and deploying computer-readable code (e.g., program code 514) in a computer system (e.g., computer system 102) comprising one or more processors (e.g., CPU 502), wherein the processor(s) carry out instructions contained in the code causing the computer system to identify a trend in heat map data.

In another embodiment, the invention provides a method that performs the process steps of the invention on a subscription, advertising and/or fee basis. That is, a service provider, such as a Solution Integrator, can offer to create, maintain, support, etc. a process of identifying a trend in heat map data. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The flowchart in FIGS. 2A-2B and the block diagrams in FIG. 1 and FIG. 5 illustrate the architecture, functionality, and operation of possible implementations of systems, methods, and computer program products according to various embodiments of the present invention. In this regard, each block in the flowchart or block diagrams may represent a module, segment, or portion of code (e.g., program code 514), which comprises one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of identifying a trend in data of heat maps, said method comprising:

a computer displaying a first heat map in a user interface and receiving user-configured shape(s) whose border(s) positioned over said displayed first heat map in said user interface specify respective portion(s) of said displayed first heat map, said portion(s) being initial target area(s) included in said first heat map, said initial target area(s) having respective color composition(s), and said initial target area(s) being less than an entirety of said first heat map;

said computer determining initial values indicating respective first measures of similarity in color composition between (1) color composition(s) of initial comparison area(s) included in each comparison heat map included in a plurality of comparison heat maps stored in a repository and (2) said color composition(s) of said initial target area(s), said initial comparison area(s) being respective portion(s) of each comparison heat map and being in position(s) in each comparison heat map which are identical to position(s) of said initial target area(s) in said first heat map;

said computer determining that at least some of said first measures of similarity in color composition exceed a first threshold value which indicates said color composition(s) of said initial target area(s) are similar to said color composition(s) of said initial comparison area(s) included in at least some of said comparison heat maps;

based on said first measures of similarity in color composition exceeding said first threshold value, said computer determining an initial set of comparison heat maps included in said plurality of comparison heat maps;

said computer determining an initial ranking of comparison heat maps included in said initial set of comparison heat maps based on said first measures of similarity in color composition;

based on said initial ranking, said computer initiating a display of said initial set of comparison heat maps and indications of said initial values;

said computer receiving user-configured shape(s) whose border(s) specify respective additional portion(s) of said displayed first heat map, said additional portion(s) being additional target area(s) included in said first heat map, said additional target area(s) having respective color composition(s), and said additional target area(s) being less than said entirety of said first heat map, wherein said additional target area(s) have position(s) in said first heat map that are identical to position(s) of additional comparison area(s) in each comparison heat map included in said initial set of comparison heat maps, and said additional comparison area(s) being respective additional portion(s) of each comparison heat map;

said computer determining additional values indicating respective second measures of similarity in color composition between said color composition(s) of said initial comparison area(s) and said color composition(s) of said initial target area(s) and between color composition(s) of said additional comparison area(s) and color composition(s) of said additional target area(s);

said computer determining that at least some of said second measures of similarity in color composition exceed a second threshold value which indicates said color composition(s) of said initial target area(s) are similar to said color composition(s) of said initial comparison area(s) included in said at least some of said comparison heat maps and further indicates said color composition(s) of said additional target area(s) are similar to said color composition(s) of said additional comparison area(s) included in some of said comparison heat maps;

based on said second measures of similarity in color composition exceeding said second threshold value, said computer determining an additional set of comparison heat maps included in said plurality of comparison heat maps;

said computer determining an additional ranking of comparison heat maps included in said additional set of comparison heat maps based on said second measures of similarity in color composition;

based on said additional ranking, said computer initiating an additional display of said additional set of comparison heat maps and indications of said additional values;

said computer determining one or more colors in said initial target area(s) indicate a first anomaly in data included in said first heat map, said first anomaly being a first problem associated with a performance of a first hardware portion of a computer network;

said computer determining one or more colors in said additional comparison area(s) and in said additional target area(s) indicate a second anomaly in data included in each comparison heat map of said additional set of comparison heat maps and in said first heat map, said second anomaly being a second problem associated with a performance of a second hardware portion of said computer network;

attempting to identify a trend relating said initial and said additional target areas based on said additional display of said additional set of comparison heat maps and said indications of said additional values;

if a result of said attempting is said trend is not identified, repeating said receiving said user-configured shape(s) whose border(s) specify respective additional portion(s) of said displayed first heat map, said determining additional values, said determining that at least some of said second measures of similarity in color composition exceed said second threshold value, said determining an additional set of comparison heat maps, said determining an additional ranking, said initiating an additional display of said additional set of comparison heat maps and said indications of said additional values, and said attempting to identify said trend until said result of said attempting is said trend is identified;

subsequent to said attempting and based on said additional display of said additional set of comparison heat maps and said indications of said additional values, identifying said trend relating said initial and said additional target areas, wherein said identifying said trend includes determining a relationship between said first anomaly and said second anomaly; and identifying a cause of said first problem based on said identified trend.

2. The method of claim 1, wherein said determining said initial values indicating said respective first measures of similarity in color composition between said color composition(s) of said initial comparison area(s) and said color composition(s) of said initial target area(s) includes determining an initial percentage of colors of said initial comparison area(s) included in a first comparison heat map included in said plurality of comparison heat maps that match colors of said initial target area(s) included in said first heat map, and wherein said determining said additional values indicating said respective second measures of similarity between said color composition(s) of said initial comparison area(s) and said color composition(s) of said initial target area(s) and between said color composition(s) of said additional comparison area(s) and color composition(s) of said additional target area(s) includes:

said determining said initial percentage of colors of said initial comparison area(s) that match said colors of said initial target area(s); and determining an additional percentage of colors of said additional comparison area(s) included in said first comparison heat map included in said plurality of comparison heat maps that match colors of said additional target area(s) included in said first heat map.

3. The method of claim 2, further comprising:

converting data associated with said initial target area(s) to said colors of said initial target area(s);

converting data associated with said additional target area(s) to said colors of said additional target area(s);

converting data associated with said initial comparison area(s) included in said first comparison heat map to said colors of said initial comparison area(s);

converting data associated with said additional comparison area(s) included in said first comparison heat map to said colors of said additional comparison area(s), wherein said determining said initial percentage of said colors of said initial comparison area(s) included in said first comparison heat map that match said colors of said initial target area(s) includes determining a match between said data associated with said initial comparison area(s) included in said first comparison heat map and said data associated with said initial target area(s), and wherein said determining said additional percentage of said colors of said additional comparison area(s) included in said first comparison heat map that match said colors of said additional target area(s) includes determining a match between said data associated with said additional comparison area(s) and said data associated with said additional target area(s).

4. The method of claim 1, further comprising:

said computer recording data of said additional set of comparison heat maps;

said computer recording times indicating when said data of said additional set of comparison heat maps is recorded and storing said times in said repository;

said computer retrieving from said repository said additional set of comparison heat maps and said additional values; and said computer retrieving from said repository said times indicating when said data of said additional set of comparison heat maps was recorded, wherein said identifying said trend relating said initial and said additional target areas is further based on said retrieved times.

5. The method of claim 1, wherein said first heat map, each comparison heat map in said initial set of comparison heat maps, and each comparison heat map in said additional set of comparison heat maps are corresponding tree maps, each tree map having data structured as a tree displayed as a set of nested rectangles, and each branch of said tree specified by one of said rectangles which is tiled with smaller rectangles representing sub-branches of said tree.

6. The method of claim 1, further comprising:

said computer determining said additional values as respective pairs of measures of similarity in color composition, each of said pairs including (1) a measure of similarity between a color composition of an initial comparison area included in each comparison heat map and a color composition of an initial target area included in said first heat map and (2) a measure of similarity between a color composition of an additional comparison area included in said additional comparison area(s) and a color composition of an additional target area included in said additional target area(s);

said computer determining averages based on said pairs of measures, each of said averages being a mean of said measures included in one of said pairs; and said computer displaying said comparison heat maps included in said additional set of comparison heat maps in an order from a first comparison heat map having a greatest average included in said averages to a last comparison heat map having a least average included in said averages, wherein said identifying said trend is based on said comparison heat maps displayed in said order.

7. A computer program product, comprising a computer-readable, tangible storage device having a computer-readable program code stored therein, said computer-readable program code containing instructions that are carried out by a central processing unit (CPU) of a computer system to implement a method of identifying a trend in data of heat maps, said method comprising:

said computer system displaying a first heat map in a user interface and receiving user-configured shape(s) whose border(s) positioned over said displayed first heat map in said user interface specify respective portion(s) of said displayed first heat map, said portion(s) being initial target area(s) included in said first heat map, said initial target area(s) having respective color composition(s), and said initial target area(s) being less than an entirety of said first heat map;

said computer system determining initial values indicating respective first measures of similarity in color composition between (1) color composition(s) of initial comparison area(s) included in each comparison heat map included in a plurality of comparison heat maps stored in a repository and (2) said color composition(s) of said initial target area(s), said initial comparison area(s) being respective portion(s) of each comparison heat map and being in position(s) in each comparison heat map which are identical to position(s) of said initial target area(s) in said first heat map;

said computer system determining that at least some of said first measures of similarity in color composition exceed a first threshold value which indicates said color composition(s) of said initial target area(s) are similar to said color composition(s) of said initial comparison area(s) included in at least some of said comparison heat maps;

based on said first measures of similarity in color composition exceeding said first threshold value, said computer system determining an initial set of comparison heat maps included in said plurality of comparison heat maps;

said computer system determining an initial ranking of comparison heat maps included in said initial set of comparison heat maps based on said first measures of similarity in color composition;

based on said initial ranking, said computer system initiating a display of said initial set of comparison heat maps and indications of said initial values;

said computer system receiving user-configured shape(s) whose border(s) specify respective additional portion(s) of said displayed first heat map, said additional portion(s) being additional target area(s) included in said first heat map, said additional target area(s) having respective color composition(s), and said additional target area(s) being less than said entirety of said first heat map, wherein said additional target area(s) have position(s) in said first heat map that are identical to position(s) of additional comparison area(s) in each comparison heat map included in said initial set of comparison heat maps, and said additional comparison area(s) being respective additional portion(s) of each comparison heat map;

said computer system determining additional values indicating respective second measures of similarity in color composition between said color composition(s) of said initial comparison area(s) and said color composition(s) of said initial target area(s) and between color composition(s) of said additional comparison area(s) and color composition(s) of said additional target area(s);

said computer system determining that at least some of said second measures of similarity in color composition exceed a second threshold value which indicates said color composition(s) of said initial target area(s) are similar to said color composition(s) of said initial comparison area(s) included in at least some of said comparison heat maps and further indicates said color composition(s) of said additional target area(s) are similar to said color composition(s) of said additional comparison area(s) included in some of said comparison heat maps;

based on said second measures of similarity in color composition exceeding said second threshold value, said computer system determining an additional set of comparison heat maps included in said plurality of comparison heat maps;

said computer system determining an additional ranking of comparison heat maps included in said additional set of comparison heat maps based on said second measures of similarity in color composition;

based on said additional ranking, said computer system initiating an additional display of said additional set of comparison heat maps and indications of said additional values;

said computer system determining one or more colors in said initial target area(s) indicate a first anomaly in data included in said first heat map, said first anomaly being a first problem associated with a performance of a first hardware portion of a computer network;

said computer system determining one or more colors in said additional comparison area(s) and in said additional target area(s) indicate a second anomaly in data included in each comparison heat map of said additional set of comparison heat maps and in said first heat map, said second anomaly being a second problem associated with a performance of a second hardware portion of said computer network;

said computer system attempting to identify a trend relating said initial and said additional target areas based on said additional display of said additional set of comparison heat maps and said indications of said additional values;

if said result of said attempting is said trend is not identified, repeating said receiving said user-configured shape(s) whose border(s) specify respective additional portion(s) of said displayed first heat map, said determining additional values, said determining that at least some of said second measures of similarity in color composition exceed said second threshold value, said determining an additional set of comparison heat maps, said determining an additional ranking, said initiating an additional display of said additional set of comparison heat maps and said indications of said additional values, and said attempting to identify said trend until said result of said attempting is said trend is identified;

subsequent to said attempting and based on said additional display of said additional set of comparison heat maps and said indications of said additional values, identifying said trend relating said initial and said additional target areas, wherein said identifying said trend includes determining a relationship between said first anomaly and said second anomaly; and identifying a cause of said first problem based on said identified trend.

8. The program product of claim 7, wherein said determining said initial values indicating said respective first measures of similarity in color composition between said color composition(s) of said initial comparison area(s) and said color composition(s) of said initial target area(s) includes determining an initial percentage of colors of said initial comparison area(s) included in a first comparison heat map included in said plurality of comparison heat maps that match colors of said initial target area(s) included in said first heat map, and wherein said determining said additional values indicating said respective second measures of similarity in color composition between said color composition(s) of said initial comparison area(s) and said color composition(s) of said initial target area(s) and between said color composition(s) of said additional comparison area(s) and color composition(s) of said additional target area(s) includes:

said determining said initial percentage of colors of said initial comparison area(s) that match said colors of said initial target area(s); and determining an additional percentage of colors of said additional comparison area(s) included in said first comparison heat map included in said plurality of comparison heat maps that match colors of said additional target area(s) included in said first heat map.

9. The program product of claim 8, wherein said method further comprises:
converting data associated with said initial target area(s) to said colors of said initial target area(s);
converting data associated with said additional target area(s) to said colors of said additional target area(s);
converting data associated with said initial comparison area(s) included in said first comparison heat map to said colors of said initial comparison area(s); and
converting data associated with said additional comparison area(s) included in said first comparison heat map to said colors of said additional comparison area(s),
wherein said determining said initial percentage of said colors of said initial comparison area(s) included in said first comparison heat map that match said colors of said initial target area(s) includes determining a match between said data associated with said initial comparison area(s) included in said first comparison heat map and said data associated with said initial target area(s), and
wherein said determining said additional percentage of said colors of said additional comparison area(s) included in said first comparison heat map that match said colors of said additional target area(s) includes determining a match between said data associated with said additional comparison area(s) and said data associated with said additional target area(s).

10. The program product of claim 7, wherein said method further comprises:
said computer system recording data of said additional set of comparison heat maps;
said computer system recording times indicating when said data of said additional set of comparison heat maps is recorded and storing said times in said repository;
said computer system retrieving from said repository said additional set of comparison heat maps and said additional values; and
said computer system retrieving from said repository said times indicating when said data of said additional set of comparison heat maps was recorded,
wherein said identifying said trend relating said initial and additional target areas is further based on said retrieved times.

11. The program product of claim 7, wherein said first heat map, each comparison heat map in said initial set of comparison heat maps, and each comparison heat map in said additional set of comparison heat maps are corresponding tree maps, each tree map having data structured as a tree displayed as a set of nested rectangles, and each branch of said tree specified by one of said rectangles which is tiled with smaller rectangles representing sub-branches of said tree.

12. The computer program product of claim 7, wherein said method further comprises:
said computer system determining said additional values as respective pairs of measures of similarity in color composition, each of said pairs including (1) a measure of similarity between a color composition of an initial comparison area included in each comparison heat map and a color composition of an initial target area included in said first heat map and (2) a measure of similarity between a color composition of an additional comparison area included in said additional comparison area(s) and a color composition of an additional target area included in said additional target area(s);
said computer system determining averages based on said pairs of measures, each of said averages being a mean of said measures included in one of said pairs; and
said computer system displaying said comparison heat maps included in said additional set of comparison heat maps in an order from a first comparison heat map having a greatest average included in said averages to a last comparison heat map having a least average included in said averages, wherein said identifying said trend is based on said comparison heat maps displayed in said order.

13. A process for supporting computing infrastructure, said process comprising providing at least one support service for at least one of creating, integrating, hosting, maintaining, and deploying computer-readable code in a computer system comprising a central processing unit (CPU), wherein said CPU carries out instructions contained in said code causing said computer system to perform a method of identifying a trend in data of heat maps, said method comprising:
said computer system displaying a first heat map in a user interface and receiving user-configured shape(s) whose border(s) positioned over said displayed first heat map in said user interface specify respective portion(s) of said displayed first heat map, said portion(s) being initial target area(s) included in said of a first heat map, said initial target area(s) having respective color composition(s), and said initial target area(s) being less than an entirety of said first heat map;
said computer system determining initial values indicating respective first measures of similarity in color composition between (1) color composition(s) of initial comparison area(s) included in each comparison heat map included in a plurality of comparison heat maps stored in a repository and (2) said color composition(s) of said initial target area(s), said initial comparison area(s) being respective portion(s) of each comparison heat map and being position(s) in each comparison heat map which are identical to position(s) of said initial target area(s) in said first heat map;
said computer system determining that at least some of said first measures of similarity in color composition exceed a first threshold value which indicates said color composition(s) of said initial target area(s) are similar to said color composition(s) of said initial comparison area(s) included in at least some of said comparison heat maps;
based on said first measures of similarity in color composition exceeding said first threshold value, said computer system determining an initial set of comparison heat maps included in said plurality of comparison heat maps;
said computer system determining an initial ranking of comparison heat maps included in said initial set of comparison heat maps based on said first measures of similarity in color composition;
based on said initial ranking, said computer system initiating a display of said initial set of comparison heat maps and indications of said initial values;
said computer system receiving user-configured shape(s) whose border(s) specify respective additional portion(s) of said displayed first heat map, said additional portion(s) being additional target area(s) included in said first heat map, said additional target area(s) having respective color composition(s), and said additional target area(s) being less than said entirety of said first heat map, wherein said additional target area(s) have position(s) in said first heat map that are identical to position(s) of additional comparison area(s) in each comparison heat map included in said initial set of comparison heat maps, and said additional comparison area(s) being respective additional portion(s) of each comparison heat map;

said computer system determining additional values indicating respective second measures of similarity in color composition between said color composition(s) of said initial comparison area(s) and said color composition(s) of said initial target area(s) and between color composition(s) of said additional comparison area(s) and color composition(s) of said additional target area(s);

said computer system determining that at least some of said second measures of similarity in color composition exceed a second threshold value which indicates said color composition(s) of said initial target area(s) are similar to said color composition(s) of said initial comparison area(s) included in at least some of said comparison heat maps and further indicates said color composition(s) of said additional target area(s) are similar to said color composition(s) of said additional comparison area(s) included in some of said comparison heat maps;

based on said second measures of similarity in color composition exceeding said second threshold value, said computer system determining an additional set of comparison heat maps included in said plurality of comparison heat maps;

said computer system determining an additional ranking of comparison heat maps included in said additional set of comparison heat maps based on said second measures of similarity in color composition;

based on said additional ranking, said computer system initiating an additional display of said additional set of comparison heat maps and indications of said additional values;

said computer system determining one or more colors in said initial target area(s) indicate a first anomaly in data included in said first heat map, said first anomaly being a first problem associated with a performance of a first hardware portion of a computer network;

said computer system determining one or more colors in said additional comparison area(s) and in said additional target area(s) indicate a second anomaly in data included in each comparison heat map of said additional set of comparison heat maps and in said first heat map, said second anomaly being a second problem associated with a performance of a second hardware portion of said computer network;

attempting to identify a trend relating said initial and said additional target areas based on said additional display of said additional set of comparison heat maps and said indications of said additional values;

if said result of said attempting is said trend is not identified, repeating said receiving said user-configured shape(s) whose border(s) specify respective additional portion(s) of said displayed first heat map, said determining additional values, said determining that at least some of said second measures of similarity in color composition exceed said second threshold value, said determining an additional set of comparison heat maps, said determining an additional ranking, said initiating an additional display of said additional set of comparison heat maps and said indications of said additional values, and said attempting to identify said trend until said result of said attempting is said trend is identified;

subsequent to said attempting and based on said additional display of said additional set of comparison heat maps and said indications of said additional values, identifying said trend relating said initial and said additional target areas, wherein said identifying said trend includes determining a relationship between said first anomaly and said second anomaly; and identifying a cause of said first problem based on said identified trend.

14. The process of claim 13, wherein said determining said initial values indicating said respective first measures of similarity in color composition between said color composition(s) of said initial comparison area(s) and said color composition(s) of said initial target area(s) includes determining an initial percentage of colors of said initial comparison area(s) included in first comparison heat map included in said plurality of comparison heat maps that match colors of said initial target area(s) included in said first heat map, and wherein said determining said additional values indicating said respective second measures of similarity in color composition between said color composition(s) of said initial comparison area(s) and said color composition(s) of said initial target area(s) and between said color composition(s) of said additional comparison area(s) and said color composition(s) of said additional target area(s) includes:

said determining said initial percentage of colors of said initial comparison area(s) that match said colors of said initial target area(s); and determining an additional percentage of colors of said additional comparison area(s) included in said first comparison heat map included in said plurality of comparison heat maps that match colors of said additional target area(s) of said first heat map.

15. The process of claim 14, wherein said method further comprises:

said computer system converting data associated with said initial target area(s) to said colors of said initial target area(s);

said computer system converting data associated with said additional target area(s) to said colors of said additional target area(s);

said computer system converting data associated with said initial comparison area(s) included in said first comparison heat map to said colors of said initial comparison area(s);

said computer system converting data associated with said additional comparison area(s) included in said first comparison heat map to said colors of said additional comparison area(s), wherein said determining said initial percentage of said colors of said initial comparison area(s) included in said first comparison heat map that match said colors of said initial target area(s) includes determining a match between said data associated with said initial comparison area(s) included in said first comparison heat map and said data associated with said initial target area(s), and wherein said determining said additional percentage of said colors of said additional comparison area(s) included in said first comparison heat map that match said colors of said additional target area(s) includes determining a match between said data associated with said additional comparison area(s) and said data associated with said additional target area(s).

16. The process of claim 13, wherein said method further comprises:

said computer system recording data of said additional set of comparison heat maps;

said computer system recording times indicating when said data of said additional set of comparison heat maps is recorded and storing said times in said repository;

said computer system retrieving from said repository said additional set of comparison heat maps and said additional values; and said computer system retrieving from said repository said times indicating when said data of said additional set of comparison heat maps was recorded, wherein said identifying said trend relating said initial and additional target areas is further based on said retrieved times.

17. The process of claim 13, wherein said first heat map, each comparison heat map in said initial set of comparison heat maps, and each comparison heat map in said additional set of comparison heat maps are corresponding tree maps, each tree map having data structured as a tree displayed as a set of nested rectangles, and each branch of said tree specified by one of said rectangles which is tiled with smaller rectangles representing sub-branches of said tree.

18. The process of claim 13, wherein said method further comprises:

said computer system determining said additional values as respective pairs of measures of similarity in color composition, each of said pairs including (1) a measure of similarity between a color composition of an initial comparison area included in each comparison heat map and a color composition of an initial target area included in said first heat map and (2) a measure of similarity between a color composition of an additional comparison area included in said additional comparison area(s) and a color composition of an additional target area included in said additional target area(s);

said computer system determining averages based on said pairs of measures, each of said averages being a mean of said measures included in one of said pairs; and said computer system displaying said comparison heat maps included in said additional set of comparison heat maps in an order from a first comparison heat map having a greatest average included in said averages to a last comparison heat map having a least average included in said averages, wherein said identifying said trend is based on said comparison heat maps displayed in said order.

* * * * *